(12) United States Patent
Turek et al.

(10) Patent No.: US 11,409,594 B2
(45) Date of Patent: Aug. 9, 2022

(54) SELF-SUPERVISED LEARNING SYSTEM FOR ANOMALY DETECTION WITH NATURAL LANGUAGE PROCESSING AND AUTOMATIC REMEDIATION

(71) Applicant: Intel Corporation, Santa Clara, CA (US)

(72) Inventors: Javier Sebastian Turek, Beaverton, OR (US); Vy Vo, Portland, OR (US); Javier Perez-Ramirez, North Plains, OR (US); Marcos Carranza, Portland, OR (US); Mateo Guzman, Beaverton, OR (US); Cesar Martinez-Spessot, Hillsboro, OR (US); Dario Oliver, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 16/914,300

(22) Filed: Jun. 27, 2020

(65) Prior Publication Data

US 2020/0364107 A1    Nov. 19, 2020

(51) Int. Cl.
| | |
|---|---|
| *G06F 11/07* | (2006.01) |
| *G06F 40/279* | (2020.01) |
| *G06N 3/02* | (2006.01) |
| *G06F 11/30* | (2006.01) |
| *G06F 40/30* | (2020.01) |
| *G06F 40/56* | (2020.01) |

(52) U.S. Cl.
CPC ........ *G06F 11/0793* (2013.01); *G06F 11/079* (2013.01); *G06F 11/0751* (2013.01); *G06F 11/0787* (2013.01); *G06F 11/3072* (2013.01); *G06F 40/279* (2020.01); *G06N 3/02* (2013.01); *G06F 40/30* (2020.01); *G06F 40/56* (2020.01)

(58) Field of Classification Search
CPC ............ G06F 11/0793; G06F 11/0751; G06F 11/0787; G06F 11/079; G06F 40/279; G06N 3/02
See application file for complete search history.

(56) References Cited

U.S. PATENT DOCUMENTS

| | | | | |
|---|---|---|---|---|
| 10,838,843 | B1 * | 11/2020 | Narasimha | .......... G06F 11/3089 |
| 11,200,151 | B1 * | 12/2021 | Cates | .................. G06F 11/3664 |
| 2017/0339175 | A1 | 11/2017 | Horesh et al. | |
| 2018/0270261 | A1 * | 9/2018 | Pande | ................. H04L 63/1425 |
| 2019/0163553 | A1 * | 5/2019 | Ramegowda | ....... G06F 11/0715 |

(Continued)

OTHER PUBLICATIONS

"Abhishek Dwaraki et al., Automated Event Identification from Systems Logs Using Natural Language Processing, 2020" (Year: 2020).*

(Continued)

*Primary Examiner* — Matthew M Kim
*Assistant Examiner* — Kyle Emanuele
(74) *Attorney, Agent, or Firm* — Jordan IP Law, LLC

(57) ABSTRACT

Systems, apparatuses and methods may provide for technology that identifies a sequence of events associated with a computer architecture, categorizes, with a natural language processing system, the sequence of events into a sequence of words, identifying an anomaly based on the sequence of words and triggering an automatic remediation process in response to an identification of the anomaly.

25 Claims, 15 Drawing Sheets

(56) References Cited

U.S. PATENT DOCUMENTS

2020/0076840 A1    3/2020  Peinador et al.
2021/0390664 A1*  12/2021  Pohl .................. G06N 3/08

OTHER PUBLICATIONS

European Search Report for EPO Patent Application No. 20213989.5, dated Jun. 11, 2021, 7 pages.
"GNU Grep 3.4," gnu.org/software/grep/manual/grep.html, retrieved Jun. 26, 2020, 50 pages.
"Log Management," splunk.com/en_us/central-log-management.html, retrieved Jun. 26, 2020, 7 pages.
"Artificial Intelligence & Machine Learning," splunk.com/en_us/machine-learning-artificial-intelligence.html, retrieved Jun. 26, 2020, 10 pages.
Mollica et al., "Composition is the Core Driver of the Language-selective Network," Neurobiology of Language, The MIT Press, Jul. 9, 2019, pp. 104-134.
Du et al., "DeepLog: Anomaly Detection and Diagnosis from System Logs through Deep Learning," Session F2: Insights from Log(in)s, CCS'17, Oct. 30-Nov. 3, 2017, pp. 1285-1298.
Hupkes et al., "Compositionality decomposed: how do neural networks generalise?," Journal of Artificial Intelligence Research 67, arXiv:1908.08351, Feb. 23, 2020, 41 pages.
Merity et al., "An Analysis of Neural Language Modeling at Multpie Scales," arXiv:1803.0824, Mar. 22, 2018, 10 pages.
Delvin et al. "BERT: Pre-training of Deep Bidrectional Transformers for Language Understanding," arXiv:1810.04805, May 24, 2019, 16 pages.

* cited by examiner

SELF-SUPERVISED LEARNING SYSTEM FOR ANOMALY DETECTION WITH NATURAL LANGUAGE PROCESSING AND AUTOMATIC REMEDIATION

TECHNICAL FIELD

Embodiments generally relate to detecting anomalous events based on natural language processing and neural network processing. More particularly, embodiments relate to a self-supervised learning system that may analyze system behavior over extended periods of time and detect anomalous events independent of human intervention and based on natural language processing.

BACKGROUND

Systems may log events while a computer and/or robotic system is operating, allowing users (e.g., engineers) to identify what sequence of events could lead to malfunctions or errors. Standard logging mechanisms may record event types with timestamps to record their order. Additional information about the system state or event properties may also be included so that the additional information may be used in failure diagnostics later. Identification of errors and/or anomalous conditions based on such logs may be a complex problem in systems in which many events (e.g., thousands to millions) are generated concurrently or in parallel from several different sources. Remediation of such errors and/or anomalous conditions may be hindered due to the time consumed to analyze such logs which may be detrimental to system operation and maintenance.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
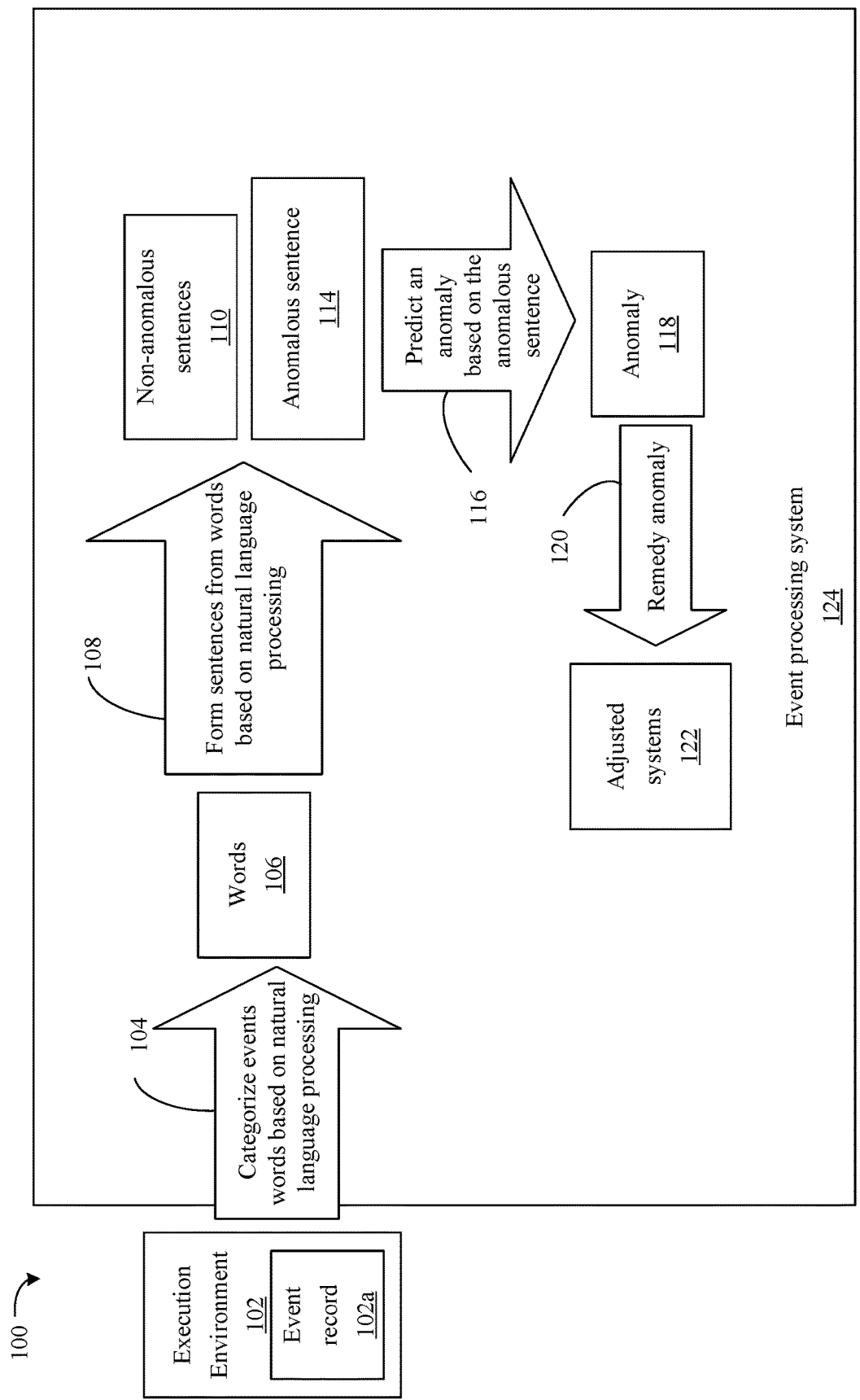
FIG. 1 is processes of examples of anomaly detection according to an embodiment.

Turning now to FIG. 1, an anomaly detection process 100 is illustrated. In detail, an event processing system 124 (e.g., a computing device) may include machine learning (e.g., a neural network) to appreciate and harness natural language processing of events in computer architectures. For example, the event processing system 124 may treat the events as words in a natural language and learn the structure and meaning of the language by training a natural language-based processing (NLP) system to predict events (e.g., similar to predicting words in a sentence). Anomalies may be detected when low probability sequences of words are encountered (e.g., an unexpected sentence is formed by words corresponding to the events) and/or when a sentence corresponding to a loss in quality (e.g., hardware device errors or diminished return) is identified. Anomalies may be flagged as low probability events to trigger remediation actions by an automated system such as the event processing system 124.

The event processing system 124 may provide an overall enhancement to performance of existing products and accelerate product development and debugging due to the efficient and enhanced identification of anomalies, and remediation of the anomalies. Moreover, some embodiments may identify and remove errors, solve serious problems, and automatically remediate (e.g., with no human intervention) issues in robotic and computer architectures to enhance user safety, user experience, efficiency and success. For example, some embodiments may be drawn to a development and execution process of a complex software product. The event processing system 124 may analyze failed logs of the software product to identify specific portions of the software product that cause failure and remediate those portions (e.g., modify the computer code of the software product).

Some embodiments may be drawn hardware implementations. For example, some embodiments may be drawn to a development and execution process of a hardware based product. The event processing system 124 may analyze failed and/or successful logs of the hardware product to identify implementations of the hardware product that cause failure and remediate those portions (e.g., utilize different hardware elements to execute some processes, reprogram configurable logic, etc.). In detail, some embodiments may be drawn to ensuring reliable communications in a wireless network. The event processing system 124 may analyze communications between the wireless network and insert commands (e.g., events) to remediate potential anomalies.

In some embodiments, the event processing system 124 may be trained to define a unique vocabulary (e.g., words identified from log events) and domain specific language (e.g., syntax rules, semantics, grammatical structure, probabilities of words occurring proximate each other, dependencies between events or words, etc.) for a particular architecture and/or process. For example, the event processing system 124 may define the domain specific language with words present in log statements in code, and the rules may be derived from the expected orders of those words in a successful execution log (e.g., process occurs without anomaly and to achieve a specific goal). The expected grammatical structure may be defined by the type of events associated with the execution environment 102 and the order in which the events typically occur in the execution environment 102. The domain specific language may be generated specifically for the execution environment 102. In some embodiments, the event processing system 124 may be a neural network that is trained on a body of data. In this example, the particular architecture and/or process is the execution environment 102. The execution environment 102 may be any environment, such as an indoor industrial wireless network, a computing device executing source code, a wireless network, a processing environment to deploy software for debugging, etc.

The execution environment 102 may generate an event record 102*a*. The event record 102*a* may be a series of events, a log of the events, readings from devices (e.g., readings from network devices), etc. The events may correspond to execution of processes in the execution environment 102. For example, the events may be measurements or commands of the processes.

The event processing system 124 may access the event record 102*a*. For example, the event processing system 124 may receive periodic updates from the execution environment 102, updates every time a new event in the execution environment 102 occurs, and/or read the event record 102*a* when triggered.

The event processing system 124 may categorize the events of the event record 102*a* into words 106 based on natural language processing 104 (e.g., the neural network may identify the words). For example, the event processing system 124 may execute an automated process that extracts unique words or events (e.g., code execution snippets, readings from devices, etc.) from the event record 102*a* (e.g., a log) and stores the words 106 into a local data structure (e.g., memory). The automated process may be executed over the entire event record 102*a* to identify the words 106. Thus, the event processing system 124 may substitute words 106 for events that occur in a system execution session.

The event processing system 124 may further form sentences from the words 106 and based on natural language processing. For example, the event processing system 124 (e.g., with an NLP system) may attempt to infer structure or meaning from a string of the words 106 based on the defined vocabulary and rules of the domain specific language. In other words, the event processing system 124 may attempt to generate a proper grammatical sentence according to the domain specific language and may further attempt to predict words (e.g., corresponding to events) in the sentence. If the event processing system 124 is unable to infer structure and/or meaning from some anomalous events (reflected as anomalous words in a sentence), the event processing system 124 adjust an output (e.g., lower activation) accordingly to reflect that the structure and meaning is unable to be inferred.

For example, if the event processing system 124 is able to infer structure or meaning from the words 106, the event processing system 124 may be able to predict a next word (corresponding to an event) in the sentence (corresponding to a series of events). If the event processing system 124 cannot predict a next word in a sentence (or the next word in the sentence is unexpected), an anomalous condition may be occurring (e.g., a situation in which normal execution is being interrupted resulting in a sequence of unusual events and corresponding words).

Sentences that do not follow normal syntax may be categorized as unexpected sentence and stored as anomalous sentences 114, while sentences that do follow normal syntax may be categorized as non-anomalous sentences 110 (e.g., sentences that represent a deviation from an expected behavior). Thus, an expected sentence may generally represent temporal sequences of events (e.g., words), in a particular grammatical structure (e.g., order with some permutations allowed). The expected grammatical structure of the expected sentences is defined by the type of events associated with the expected sentences and the order in which the events typically occur.

As noted, in some embodiments, the event processing system 124 may include a neural network to identify sentences and provide responses (e.g., response levels) based on the sentences. The neural network may have a response (e.g., response level) that is based on the probability of an event (e.g., word) occurring, and whether the event actually occurs. For example, given a prior three words (corresponding to three events) in a sentence, the neural network may predict a fourth word (prior to a fourth event being processed) will follow in the sentence. An example is as follows in the following sentence word 1, word 2, word 3, predicted word 4. Thereafter, the event processing system 124 may receive the fourth event. If the event processing system 124 translates the fourth event into the "word 4" based on natural language processing, the sentence may be expected. If, however the fourth event does not correspond to the fourth word (e.g., corresponds to a word 5), the sentence may be deemed unexpected since the sentence has the structure of word 1, word 2, word 3, word 5.

In some embodiments, more than one word may be predicted. For example, suppose that the following sentence is identified word 1, word 2, word 3. The event processing system 124 may predict that predicted word 4 and predicted word 6 are likely to occur based on word 1, word 2, word 3 (e.g., predicted word 4 may have a probability of occurring above a threshold, and predicted word 6 may have a probability of occurring above the threshold). Thereafter, the event processing system 124 may receive the fourth event. If the event processing system 124 translates the fourth event into the "word 6" or "word 4" based on the natural language processing described above, the sentence may be expected. If, however the fourth event does not correspond to the fourth word (e.g., corresponds to a word 5), the sentence may be deemed unexpected since the sentence has the structure of word 1, word 2, word 3, word 5.

In some embodiments, if the neural network is unable to predict a next word (neural network cannot predict a word that has a high enough probability of occurring and/or is consistently incorrect in predictions) based on a series of prior words, the sentence may be deemed unexpected and unpredictable. In such cases, the response (e.g., a response level) of the neural network may be low (unable to find a suitable next word to cause a low response level). When the neural network is able to predict a word with high probability the neural network may be deemed to have a maximized response (e.g., response level is high). Thus, the neural network may be trained to provide response levels based on expected or unexpected sentences (e.g., output low response level when unexpected sentences occur indicating an anomaly is detected in response to unexpected behaviors and output high response level when sentences are expected and there is no anomaly).

In some embodiments, the event processing system 124 may conduct a quality-of-service analysis based on the words 106. For example, the event processing system 124 may predict a quality-of-service (e.g., packet data rate) of the execution environment 102 based on identified sentences. If a sentence corresponds to the quality-of-service degrading, the event processing system 124 may classify the sentence as an anomalous sentence 114 and output a corresponding activation energy.

The event processing system 124 may thus form sentences from words 106 based on natural language processing 108 to form non-anomalous sentences 110 (which may be represented by activation energies in the NLP system) and an anomalous sentence 114 (represented by activation energies). As noted, the anomalous sentence 114 may be unpredictable sentences, sentences in which words 106 logically would be unlikely to follow each other, and/or sentences that indicate a degradation of the quality-of-service (e.g., a sentence may be identified as corresponding to a drop in quality-of-service).

Thus, in some embodiments, the event processing system 124 may include the NLP system that is trained to only respond strongly to sentences associated with expected events (e.g., expected sentences). Additionally, the event processing system 124 may be trained to exhibit strong responses to sentences containing the same sets of events while preserving local coherence in the events. The event processing system 124 may identify potential situations that lead to anomalies or system failures by measuring a level of responses (e.g., by the NLP system) and trigger a remediation action when the level of responses is below a threshold (e.g., response meets the threshold). For example, the NLP system may measure the level of responses in the implemented language network, where expected groups of events generate a higher response in the neural network where, and anomalous sentences represents lower response in the network.

In some embodiments, the NLP system may be trained (e.g., trained to detect anomalies) to increase the response level in response to anomalous sentences 114 (e.g., sentences that cause a loss in quality-of-service increased response level when an unexpected sentence or unexpected behavior occurs). Thus, in some embodiments, if the response level of the NLP increases above a threshold (e.g., response meets the threshold), an automatic remediation may be triggered to remediate a drop in quality-of-service.

The event processing system 124 may predict an anomaly 118 based on the anomalous sentence 114, 116 and/or the level of responses meeting a threshold. For example, the anomaly may be detected when the response level increases above a threshold in some embodiments (e.g., when the NLP is trained to increase the response level when a sentence occurs indicating an anomaly) or when the response level decreases below a threshold (e.g., when the NLP is trained to decrease the response level when an unexpected sentence occurs indicating an anomaly). The anomaly 118 may be analyzed and stored. Further, after the anomaly 118 is detected, the event processing system 124 may trigger a remediation process (or execute the remediation process) to remedy the anomaly 118, 120 to adjust systems 122. For example, the event processing system 124 may rollback system code, break local coherence of a sequence of events, utilize different wireless channels for communication, adjust hardware parameters and so forth. In some embodiments, the event processing system 124 may adjust to one or more of a hardware parameter or adjust a software parameter to remediate the anomaly.

Thus, some embodiments may provide an enhanced system and method to detect errors, mitigate errors and respond to errors based on natural language processing. Some embodiments may substantially reduce reaction times to errors and allow for enhanced operation and safety.

Figure 2:
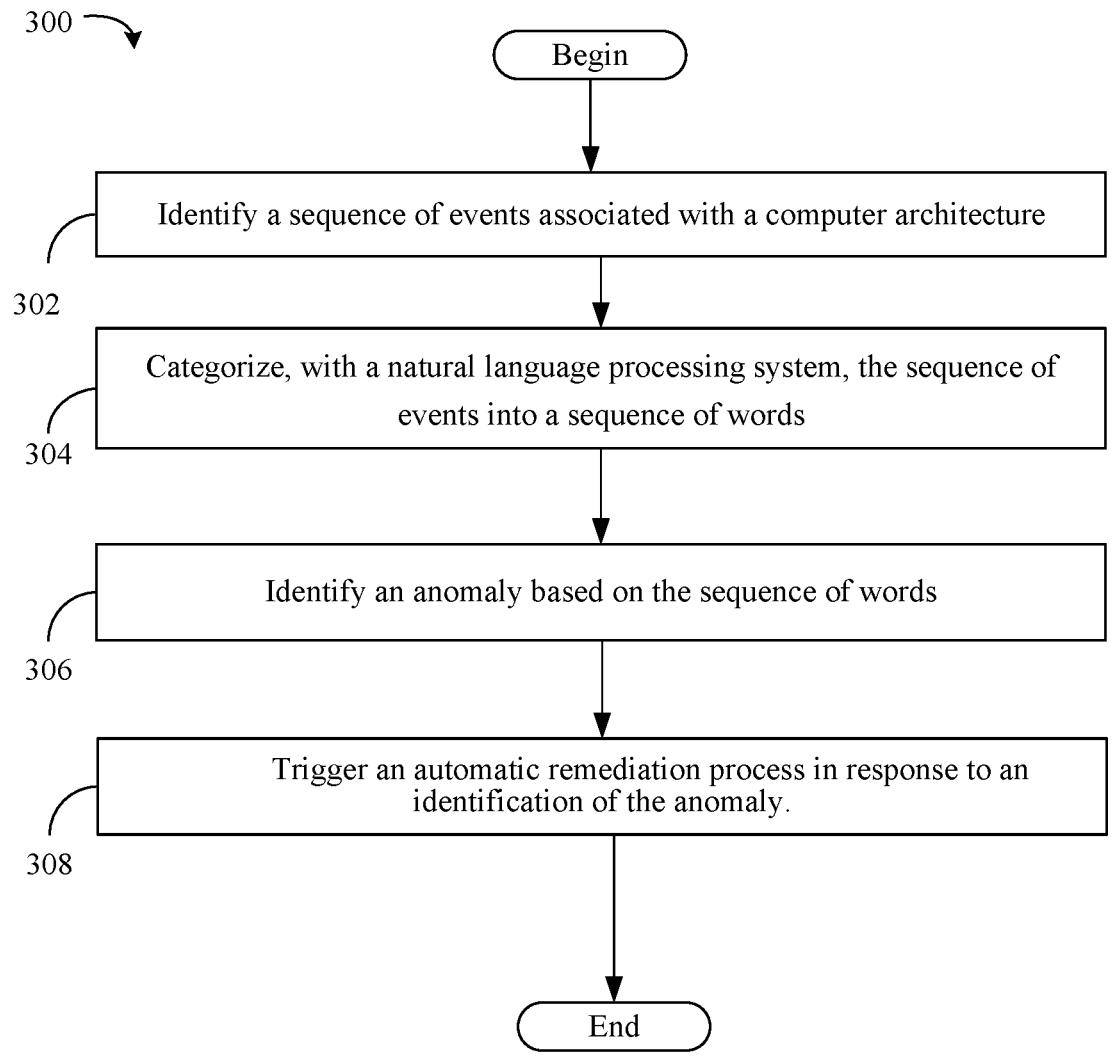
FIG. 2 is a flowchart of an example of a method of translating events into a language to detect anomalies according to an embodiment.

FIG. 2 shows a method 300 of translating events into a language to detect anomalies. The method 300 may generally be implemented in an NLP and remediation architecture such as, for example, the event processing system 124 (FIG. 1), already discussed. In an embodiment, the method 300 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 300 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 302 identifies a sequence of events associated with a computer architecture. Illustrated processing block 304 categorizes, with a natural language processing system, the sequence of events into a sequence of words. For example, processing block 304 may identify words from the sequence of events based on a vocabulary associated with the computer architecture, arrange the identified words into the sequence of words and generate at least one sentence based on the words. In some embodiments, the natural language processing system is one or more neural networks.

Illustrated processing block 306 identifies an anomaly based on the sequence words. In some embodiments, processing block 306 identifies the anomaly based on the at least one sentence. For example, processing block 306 may conduct a determination that the at least one sentence is to be dissimilar from any sentence structure defined by a domain specific language associated with the computer architecture and identify the anomaly based on the determination. Illustrated processing block 308 triggers an automatic remediation process in response to an identification of the anomaly.

In some embodiments, the method 300 may generate a level of response based on the sequence of words, wherein the level of response associated with a quality-of-service measurement, and identify the anomaly based on the level of response meeting a threshold. Further, in some embodiments, the anomaly is a deviation from an expected behavior, and the automatic remediation process includes an adjustment to one or more of a hardware parameter or an adjustment to a software parameter.

The method 300 may provide a process to detect errors. For example, the method 300 may apply unique vocabulary, semantic, logic and/or syntax rules to the events to identify whether a sequence of events may lead to detrimental performance. The method 300 may mitigate errors and respond to errors based on natural language processing. Some embodiments may substantially reduce reaction times to errors and allow for enhanced operation and safety through enhanced identification of such errors and mitigation thereof.

Figure 3:
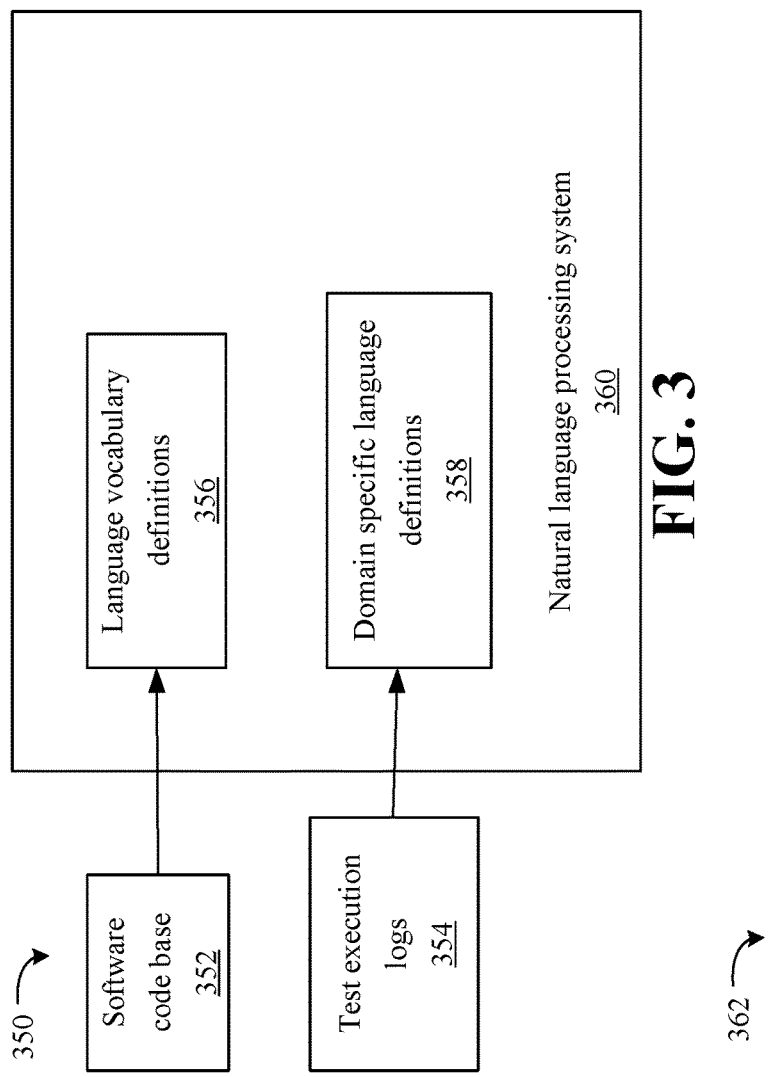
FIG. 3 is a block diagram of examples of training a natural language processing system according to an embodiment.

FIG. 3 illustrates an NLP system learning and training process 350. The process 350 may be implemented to train for example, the event processing system 124 (FIG. 1), and/or to implement aspects of the method 300 (FIG. 2) already discussed. A software code base 352 and test execution logs 354 may be provided as inputs into the learning and training process 350. The NLP system 360 may be a neural network that will be trained to identify anomalous events.

The process 350 may include creating a Domain Specific Language (DSL) definitions 358 that gives structure and meaning to expected events that occur during normal functioning of a system under consideration and associated with the test execution logs 354. A DSL may be generated for any system that generates logs, by defining a Language Vocabulary and by training the NLP system 360 to give structure and meaning to log events. In some embodiments, the log events may be produced by a system running under normal conditions (e.g., no anomalies). The NLP system 360 may use the DSL 358 to translate from a log of events to sentences of words.

For example, in a software development scenario, log artifacts describing various system events may be produced by successful test execution sessions. The temporal correlation of these events may represent the body of expected events in the system. The NLP system 360 may reference timestamps to identify the temporal correlations. The NLP system 360 may be trained to identify "sentence structures" based on the temporal correlations. For example, the "sentence structures" may be determined by neural network layers of the NLP system 360. The "sentence structures" may not be formally defined, but the NLP system 360 may be trained to learn probabilities between words and thus, if a sentence belongs to the language or not. The NLP system 360 may further, based on the temporal correlations, identify expected interactions and state transitions between different log events in the test execution log 354. The NLP system 360 may handle events that are expressed in diverse formats following a non-predefined structure (e.g., similar to variations in syntax and semantics of the natural human language).

In some embodiments, events in a wireless network associated with a loss in quality of service (QoS) such as packet delivery rate (PDR) may be monitored. The test execution logs 354 may be logs associated with drops in the received signal strength indicator (RSSI) collected from different stations (STA), increase in the frequency selectivity of the wireless links through the analysis of the collected channel state information, or the health of the wireless interfaces used to connect stations to access points. The NLP system 360 may analyze the test execution logs 354 to determine syntax and generate the DSL definitions 358.

The NLP system 360 may generate language vocabulary definitions 356 to generate a "language vocabulary" based on a software code base 352. To do so, the NLP system 360 defines the equivalent of a word in a language. For example, each unique log event from the software code base 352 may form a unique word in the language vocabulary. The log events may be printed from the software code base 352. Timestamps generated during the printing may be discarded and ignored for language vocabulary definition generation. The NLP system 360 may log events generated by lines in the software code base 352. An automated process may be used to extract the unique words from the software code base 352 (e.g., through printing to logs and analysis of the logs). To form a complete language vocabulary, the automated process may be executed over the entire software code base 352. Upon completion, the NLP system 360 may generate a language vocabulary that contains a complete list of possible words that may be found in any log produced by the software, and store the language vocabulary as the language vocabulary definitions 356.

In some embodiments, words may be represented by readings collected by multiple network devices. For instance, each station in the network may have a vocabulary formed by RSSI measurements, frequency selectivity of the channel, line of sight presence and status of the wireless interface. The software code base 352 may include software codes associated with the station, and the test execution logs 354 may include logs from the station.

The NLP system 360 may thus generate the language vocabulary definitions 356 and the DSL definitions 358 to execute a training process. For example, given the language vocabulary definitions 356 and a set of logs obtained during normal system conditions, the NLP system 360 may automatically generate the DSL definitions 358 by converting each event into a unique statement in the DSL.

In some embodiments, the NLP system 360 may be trained in a self-supervised manner (e.g., self-supervised learning) based on the DSL definitions 358 and the language vocabulary definitions 356. That is, data labels may not be necessary for self-supervised training or learning. Instead, the NLP system 360 may analyze a portion of a sequence of events to predict a missing event. In doing so, the NLP system 360 may learn the temporal correlations and dependencies between events in a sequence (e.g., between words in the Domain Specific Language). The NLP system 360 may be any number of neural network architectures (e.g., recurrent neural network and/or a transformer architecture) that model natural languages and capture multiple timescales of information.

After training, the NLP system 360 may respond maximally if the NLP system 360 is presented with sentences that correspond to an expected set of events. By analogy to language, this may be understood as the NLP system 360 inferring structure or meaning from a string of words to form a cohesive and logical sentence (e.g., an expected arrangement of words). In some embodiments, if the NLP system 360 is unable to infer structure or meaning from some anomalous events presented as words in a sentence (e.g., does not form a cohesive and logical sentence), the NLP system 360 may have a lower activation.

For example, the NLP system 360 may predict a next event after a first event (e.g., Event 1) based on the learning and training process 350. Event 2 may be predicted as the next event, given that it has the highest probability of being present after Event 1. If Event 2 is identified as actually having occurred, the NLP system 360 may trigger a maximized response. In an anomaly scenario, the NLP system 360 may process an event which has a low probability of occurrence considering the previous received events. The event processing continues, until the NLP system module cannot effectively predict the next event (all of them has a low probability distribution) and an anomaly is identified.

If quality-of-service of a hardware device (e.g., PDR) is to be modeled, instead of predicting what the next event is going to be, the natural language processing system 360 may predict a maximum quality-of-service (e.g., PDR in the whole network), and provide a maximized response when the quality-of-service drops below a threshold. The natural language processing system 360 may execute similarly as to described above.

In some embodiments, the NLP system 360 responds highly to log event sequences that have a local permutations. For example, sentences may still be meaningful when the order of nearby words is switched. Such implementations may be referred to as acceptable local combinability. The NLP system 360 may thus provide consistent analysis (e.g., activations) even if the order of events changes. In some embodiments, even if the order of the events changes, the order of events may maintain an acceptable local combinability (e.g., flexible sentence structures are permitted). This flexibility in the NLP system 360 reduces false positives in anomaly detection. Thus, even though the order of the events may be different between logs, the NLP system 360 may still treat the logs similarly (e.g., output a strong response) and maintain an acceptable local combinability. Both these logs will still elicit a maximal response from the NLP system 360.

In some embodiments, the occurrence of events preserving local coherence may produce the same end results for QoS and PDR analysis. For instance, observing a drop in RSSI followed by failure of one of the WLAN interfaces may have the same effect in QoS degradation than having the events occur in the opposite order.

Figure 4:
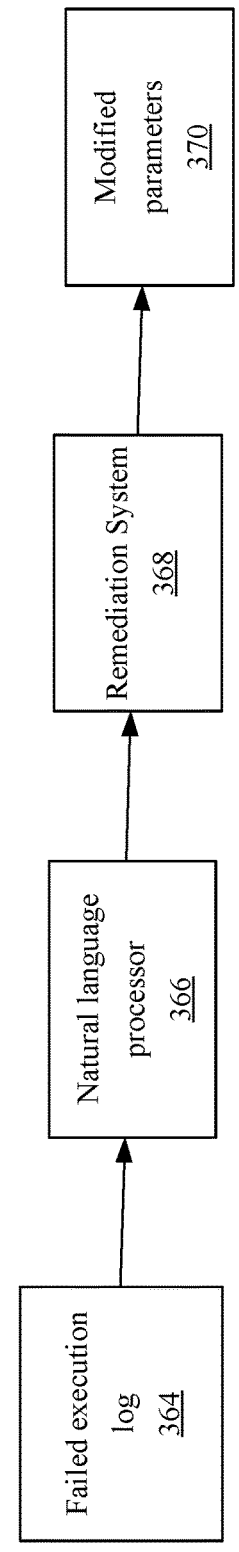
FIG. 4 is a block diagram of examples of processing detecting and remediating an anomaly according to an embodiment.

FIG. 4 illustrates an anomaly detection and remediation process 362. The process 362 may be implemented by the event processing system 124 (FIG. 1), and/or to implement aspects of the method 300 (FIG. 2) already discussed.

The natural language processor 366 processes a failed execution log 364. In some embodiments, the failed execution log 364 may have been previously processed to generate the input words and sentences. In other embodiments, the natural language processor 366 processes the failed execution log 364 to generate words and sentences. In this particular example, the natural language processor 366 detects an anomaly. The natural language processor 366 communicates the anomalous condition to the remediation system 368. The remediation system 368 may produce modified parameters 370. For example, the remediation system 368 may execute an automated software version revert mechanism to remediate the anomalous condition. Additionally, the Remediation System 368 may map the anomalous condition to specific sections of a software code base. The map may be presented to a human via a display for correction or an automatic process may correct and modify the software code base.

Figure 5A:
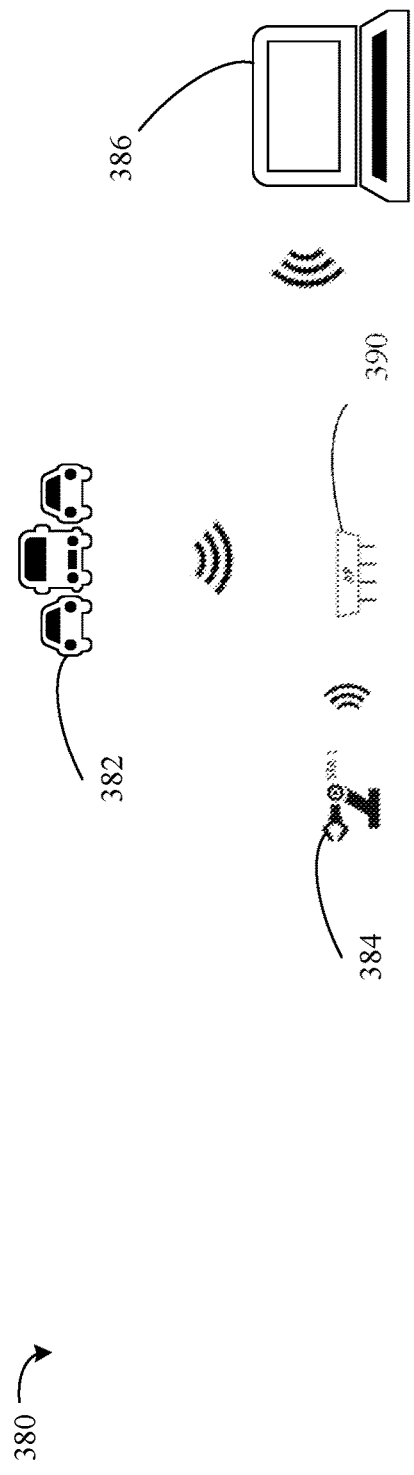
FIG. 5A is a block diagram of an example of an industrial wireless network that includes one access point according to an embodiment.

FIG. 5A illustrates an example of an industrial wireless network 380 that includes a wireless access point 390 connected to a computing device 386, vehicles 382 and robotic arm 384. The already described event processing system 124 (FIG. 1), method 300 (FIG. 2), natural language processing system 360 (FIG. 3), natural language processor 366 (FIG. 4) and/or remediation system 368 (FIG. 4) may analyze the network 380 to identify anomalies and remediate the anomalies.

As already noted, some embodiments may pertain to analyzing events (relating to quality of service and packet delivery rate) in a wireless environment and detecting anomalous events that correspond to a loss in QoS such as PDR. The PDR and QoS may pertain to communications between the wireless access point 390 connected to a computing device 386, vehicles 382 and robotic arm 384.

In such embodiments, a NLP system may include a DSL that is designed by collecting logs associated with drops in the received signal strength indicator (RSSI) collected from different stations, such as the computing device 386, vehicles 382 and robotic arm 384, increase in the frequency selectivity of the wireless links through the analysis of the collected channel state information, or the health of the wireless interfaces used to connect stations to access point 390. Thereafter, the NLP system may analyze the network 380 for anomalous events.

For example, the following words in the industrial sentence may be formed based on event logs between the robotic arm 384 and the wireless access point 390. In the below exemplary sentence, STA1 (STA as used herein refers to station) corresponds to the robotic arm 384 and AP1 corresponds to wireless access point 390: "[STA1, WLAN, on], [STA1, RSSI, −52 dBm], [STA1-AP1, LOS], [STA1-API, UL], [STA1-AP1, BE]." This sentence indicates that the robotic arm 384 (i.e., STA1) has a WLAN interface on, with received RSSI-52 dBm. The sentence further indicates that the robotic arm 384 (i.e., STA1) is connected to wireless access point 390 (i.e., AP1) and has line of sight (LOS) with wireless access point 390 (i.e., AP1). Finally, the sentence indicates an uplink (UL) transmission is of best effort network traffic.

Figure 5B:
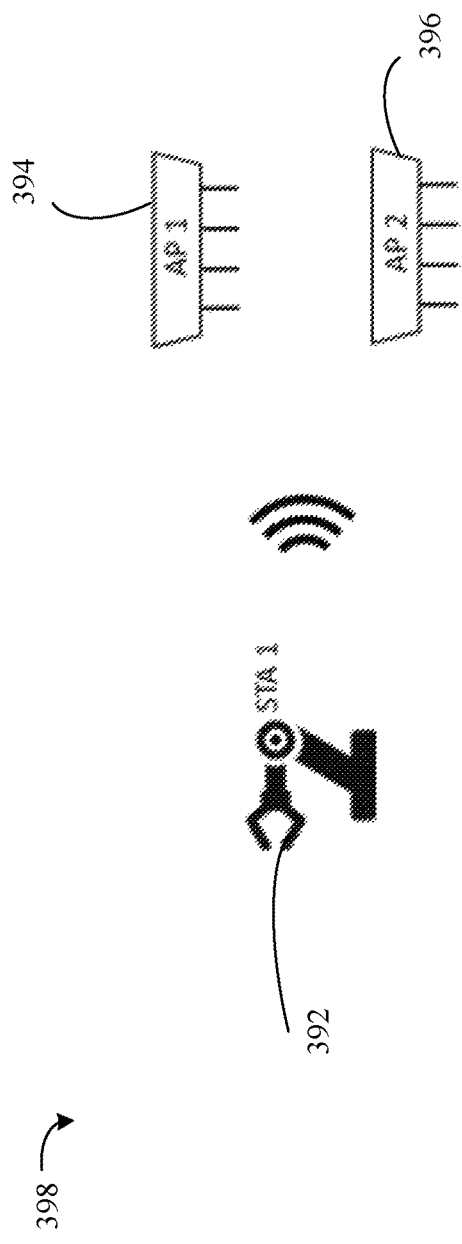
FIG. 5B is a block diagram of an example of an industrial wireless network that includes multiple access points according to an embodiment.

FIG. 5B is an example of an industrial wireless network 398 that includes multiple wireless access points 396, 394 connected to a robotic arm 392. The already described event processing system 124 (FIG. 1), method 300 (FIG. 2), natural language processing system 360 (FIG. 3), natural language processor 366 (FIG. 4) and/or remediation system 368 (FIG. 4) may analyze the network 398 to identify anomalies and remediate the anomalies.

As already noted, some embodiments may pertain to analyzing events (relating to QoS and PDR) in a wireless environment and detecting anomalous events that correspond to a loss in QoS such as PDR.

In some embodiments, remediation may be achieved by breaking a local coherence of sequence of events causing a drop in PDR or QoS. For instance, suppose that the following sentence results in a low PDR: [STA1, WLAN, off], [STA1, WLAN2, on], [STA-AP1 RSSI ??], [STA-AP2 RSSI-92 dBm]. In the previous sentence, STA1 corresponds to robotic arm 392, AP1 corresponds to access point 394 and AP2 corresponds to access point 396.

In some embodiments, a remediation system (as described herein) may actively insert new events to prevent the above sentence from occurring and based on an identification that the PDR may drop after the third event. For example, by adding the event [AP2, tx-up] between the third and fourth event, the RSSI may be increased and the QoS preserved. That is, the following sentence may result in an acceptable PDR: [STA1, WLAN, off], [STA1, WLAN2, on], [STA-AP1

RSSI ??], [AP2, tx-up], [STA-AP2 RSSI-92 dBm]. Thus, the remediation system may actively track potential anomalies and insert instructions to avoid the anomalies.

Figure 6:
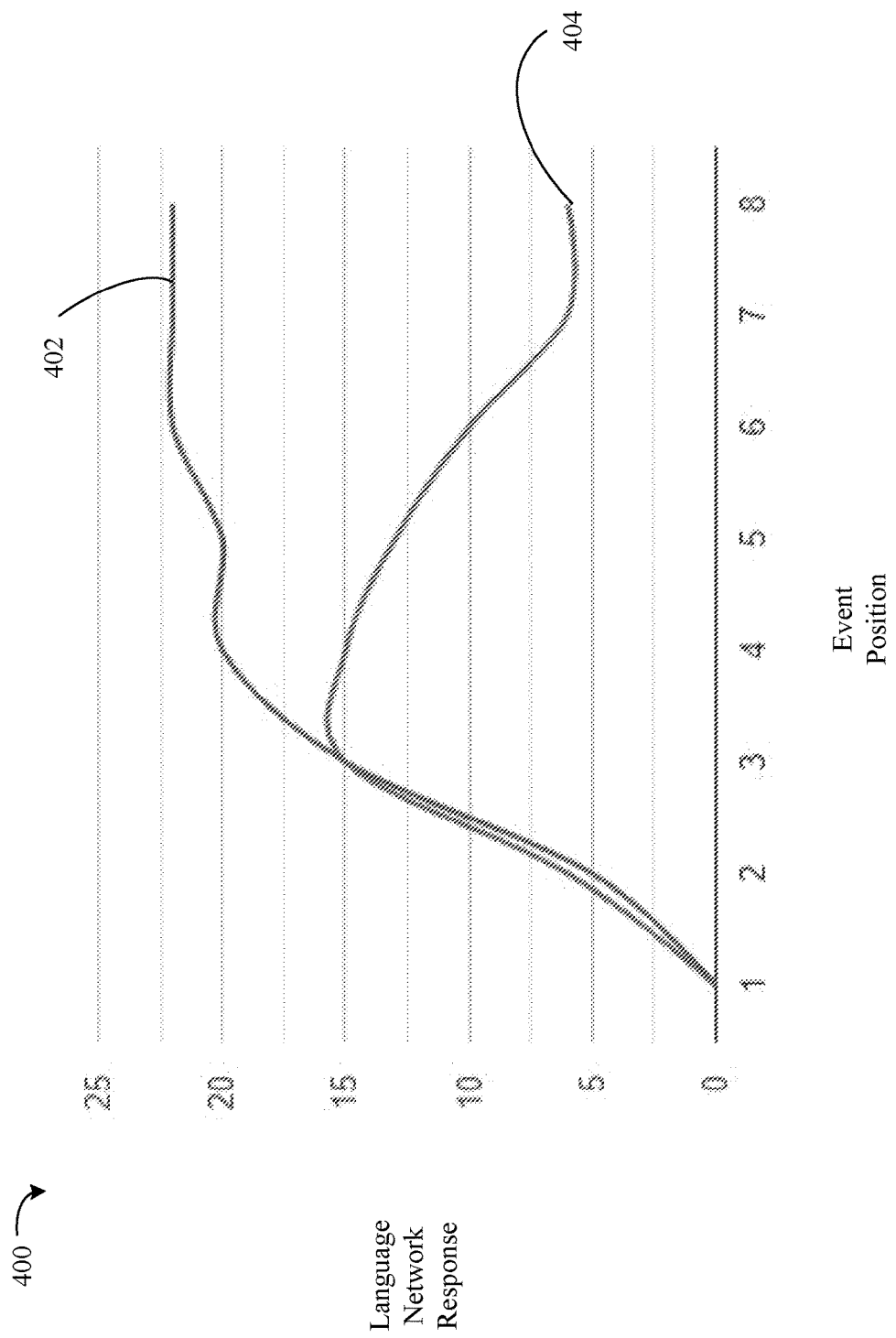
FIG. 6 is a graph of an example of natural language processing response according to an embodiment.

FIG. 6 is a graph 400 illustrating an NLP response (along the y-axis) for two different response curves 402, 404 over events (along x-axis). The NLP response may be associated with (e.g., output by) the already described event processing system 124 (FIG. 1), method 300 (FIG. 2), natural language processing system 360 (FIG. 3) and/or natural language processor 366 (FIG. 4).

In FIG. 6, the response curve 402 corresponds to an expected sentence that maximizes the response. The response curve 404 is an unexpected sentence that generates high responses on the initial events, but reduces greatly when the subsequent events are unexpected. This lower response represents anomalies.

Figure 7:
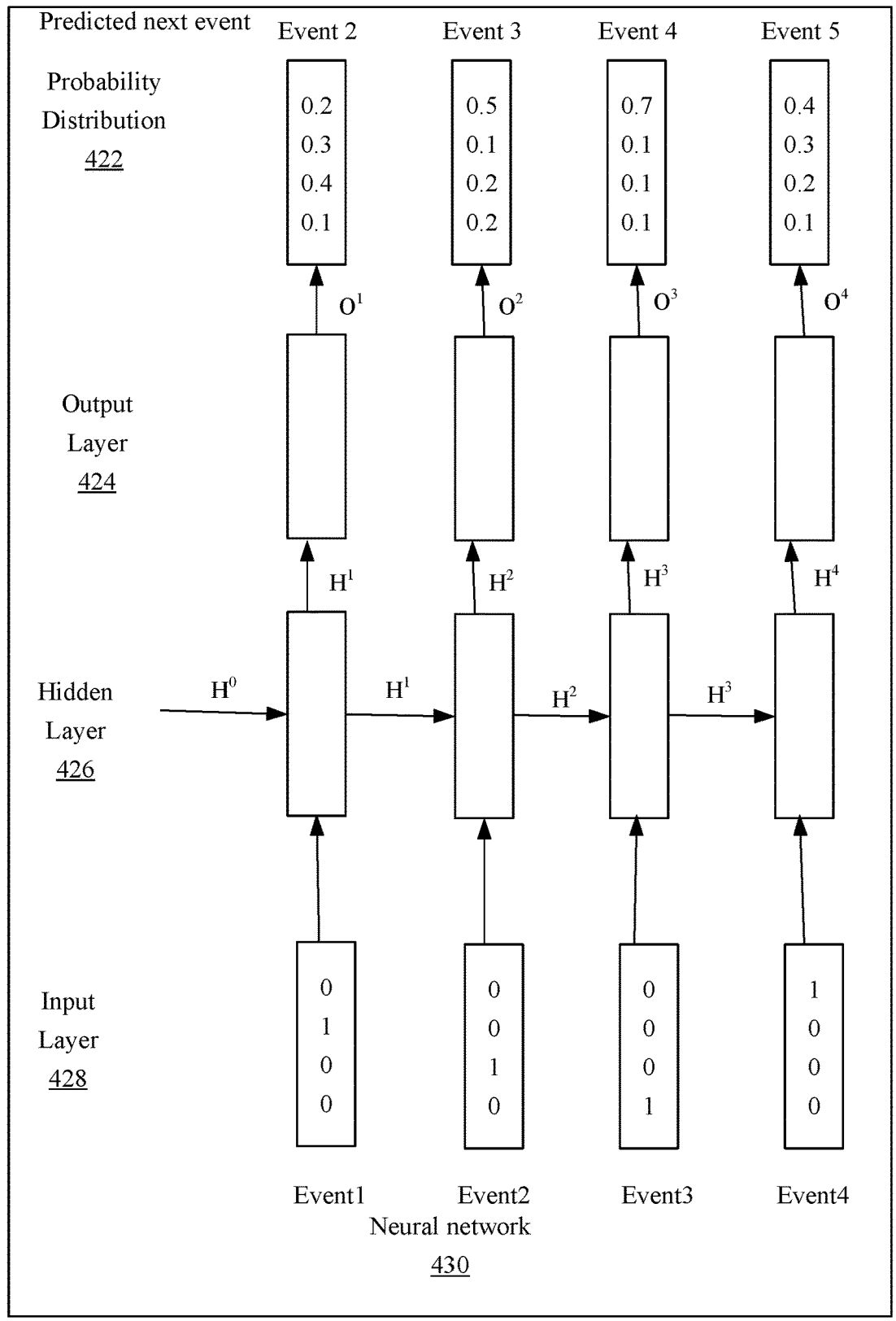
FIG. 7 is a block diagram of an example of response levels by a neural network according to an embodiment.

FIG. 7 shows an example of responses levels 420 by a neural network 430 of an NLP system for an expected group of events. The neural network 430 may be readily operated in conjunction with or replace the event processing system 124 (FIG. 1), method 300 (FIG. 2), natural language processing system 360 (FIG. 3) and/or natural language processor 366 (FIG. 4). The probability distribution 422, output layer 424, hidden layer 426 and input layer 428 may be part of the neural network 430 that is trained as described herein for NLP of events.

Given an initial input Event1 (see bottom row), the neural network 430 predicts the next event, based on the learning process described herein. The Event2 is assigned a probability distribution 422 of 0.4 and is predicted as the next event, given that Event2 has the highest probability of being present after Event1. The second event Event2 is then processed by the neural network 430 and triggers a maximized response since Event2 was predicted to occur. In contrast, if another event occurred, meaning that the neural network 430 was incorrect in the prediction of Event2, a minimal response would be triggered. That is, in an anomaly scenario, the neural network 430 will process an event with a low probability of occurrence considering the previous received events. The event processing continues, until the neural network 430 cannot effectively predict the next event (all of them has a low probability distribution).

Figure 8:
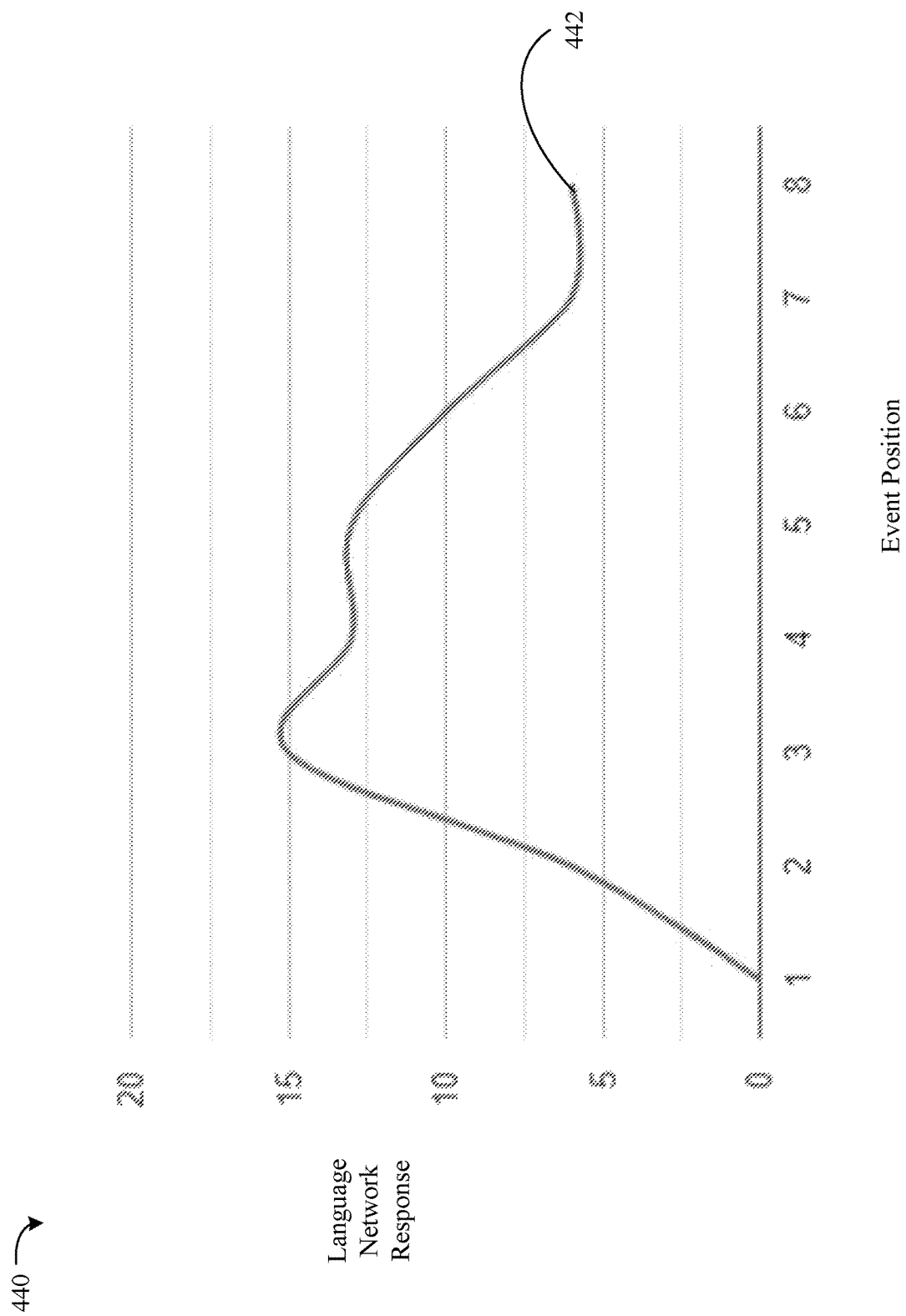
FIG. 8 is a graph of an example of natural language processing responses to one or more anomalous events according to an embodiment.

FIG. 8 illustrates a graph 440 of an NLP system responses 442 to anomalous events. The graph 440 may be outputs produced the event processing system 124 (FIG. 1), method 300 (FIG. 2), natural language processing system 360 (FIG. 3) and/or natural language processor 366 (FIG. 4).

In detail, once the NLP system is trained to predict responses in a DSL, the NLP system may be integrated in an event log processing system and used for anomaly detection. A log generated by a system session that ended in an error may be presented to the NLP system. The NLP system may process the sentences in a temporal order, having maximized activation to non-anomalous or typical events. For events that immediately precede the error, the NLP system may present a lower response of the responses 442, until the lowest response is reached in the error conditions. Doing so may aid in identifying which specific events cause an anomaly and remedying the anomaly during future deployments.

Figure 9A:
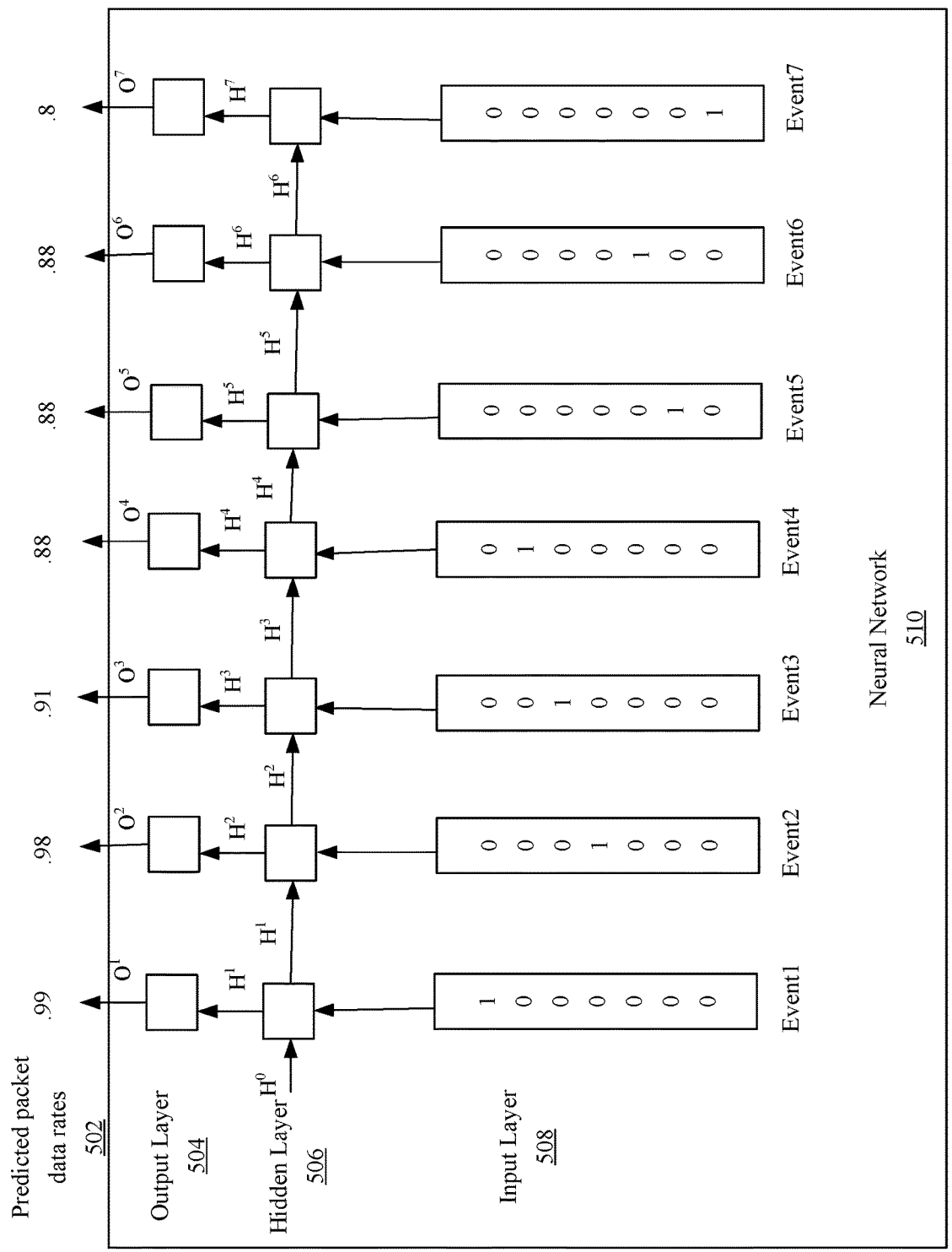
FIG. 9A is a block diagram of an example of a neural network that models a response for packet data rates according to an embodiment.

FIG. 9A illustrates a neural network 510 of an NLP that models a response for PDR. The neural network 510 may be readily substituted for or operate in conjunction with the event processing system 124 (FIG. 1), method 300 (FIG. 2), natural language processing system 360 (FIG. 3) and/or natural language processor 366 (FIG. 4). The neural network 510 includes output layer 504, hidden layer 506 and input layer 508 that output predicted PDRs 502. Instead of predicting what the next event is going to be, the neural network may predict what the maximum PDR in whole network will be output, as indicated by the predicted PDRs 502. As illustrated, the PDRs 502 decrease with the events1-events7. While PDRs 502 are described, other parameters (e.g., hardware parameters) may be quantified as a quality-of-service metric.

Figure 9B:
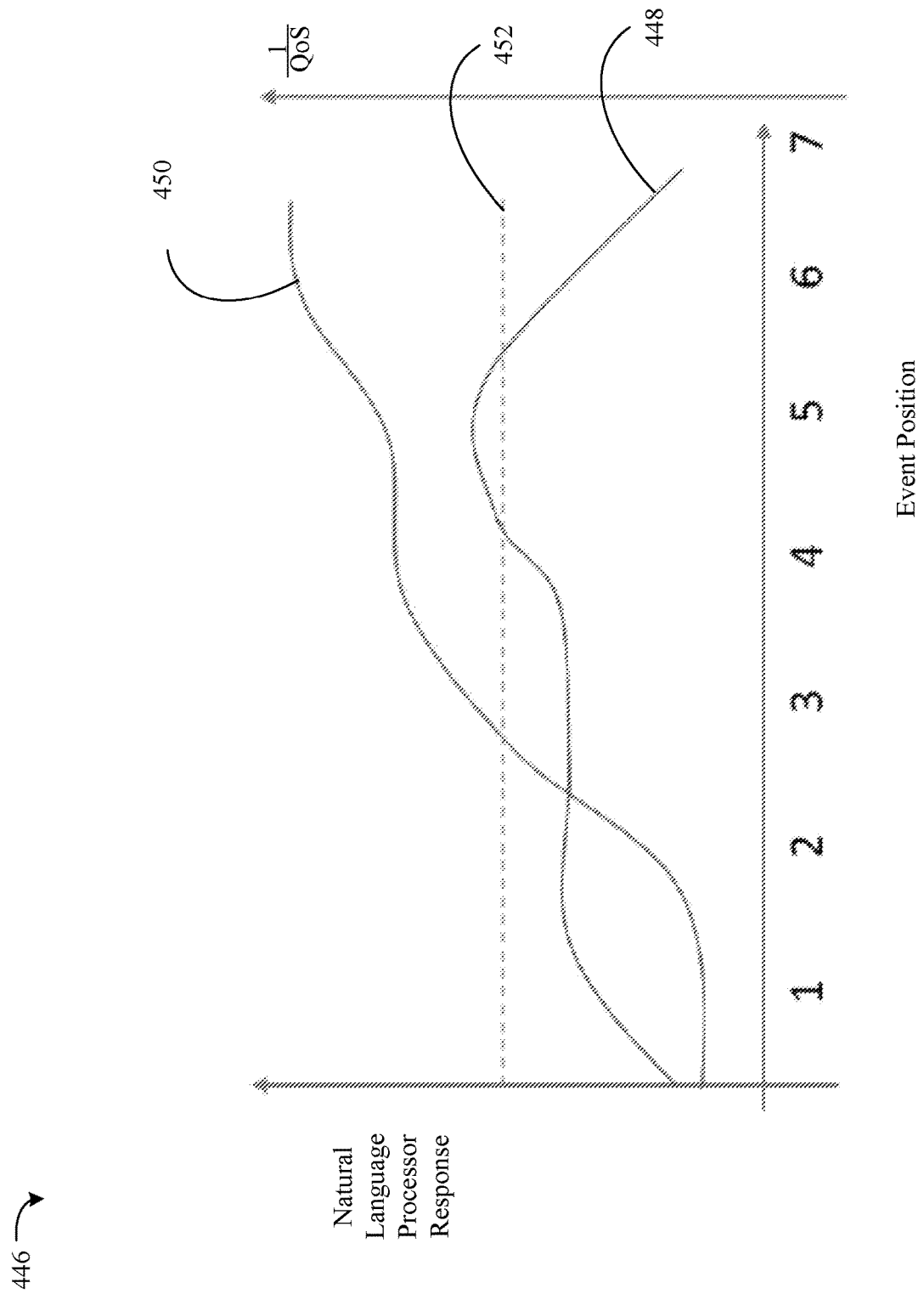
FIG. 9B is a graph of an example of natural language processing responses of a neural network according to an embodiment.

FIG. 9B illustrates a graph 446 of anomaly detection being triggered when an NLP response of the neural network 510 meets a predetermined threshold 452. The left Y-axis illustrates the NLP response and the right Y-axis is in the inverse of QoS of a computer architecture. The QoS may be the PDR of the computer architecture (e.g., the right Y-axis may be the inverse of PDR). The X-axis is the event position. In this particular example, the NLP system may be trained to increase a response when the QoS decreases (e.g., PDR decreases).

As noted, response levels may be mapped to the graph 446. For example, the neural network 510 (which may be a neural language processor) responses may be based on the predicted PDRs 502. As the PDRs 502 decrease, the response of the neural network 510 may correspondingly increase. The increase in the response is illustrated in a first response curve 450.

The threshold 452 may be associated with a significant drop in QoS. That is, FIG. 9B shows an example of the anomaly detection for positive and false detections. In this particular example, the first response curve 450 triggers an anomaly since the response of the neural network 510 increases over time above the threshold 452 and corresponds to a decrease in the QoS.

A second response curve 448 may not trigger an anomaly condition since the NLP response of a neural network drops below the threshold 452 aside for event 5. In some embodiments, the NPL may be designed such that even if the QoS is acceptable (after dropping significantly), the overall system is notified to identify a cause for the drop in QoS (even if the drop was only temporary).

Figure 10:
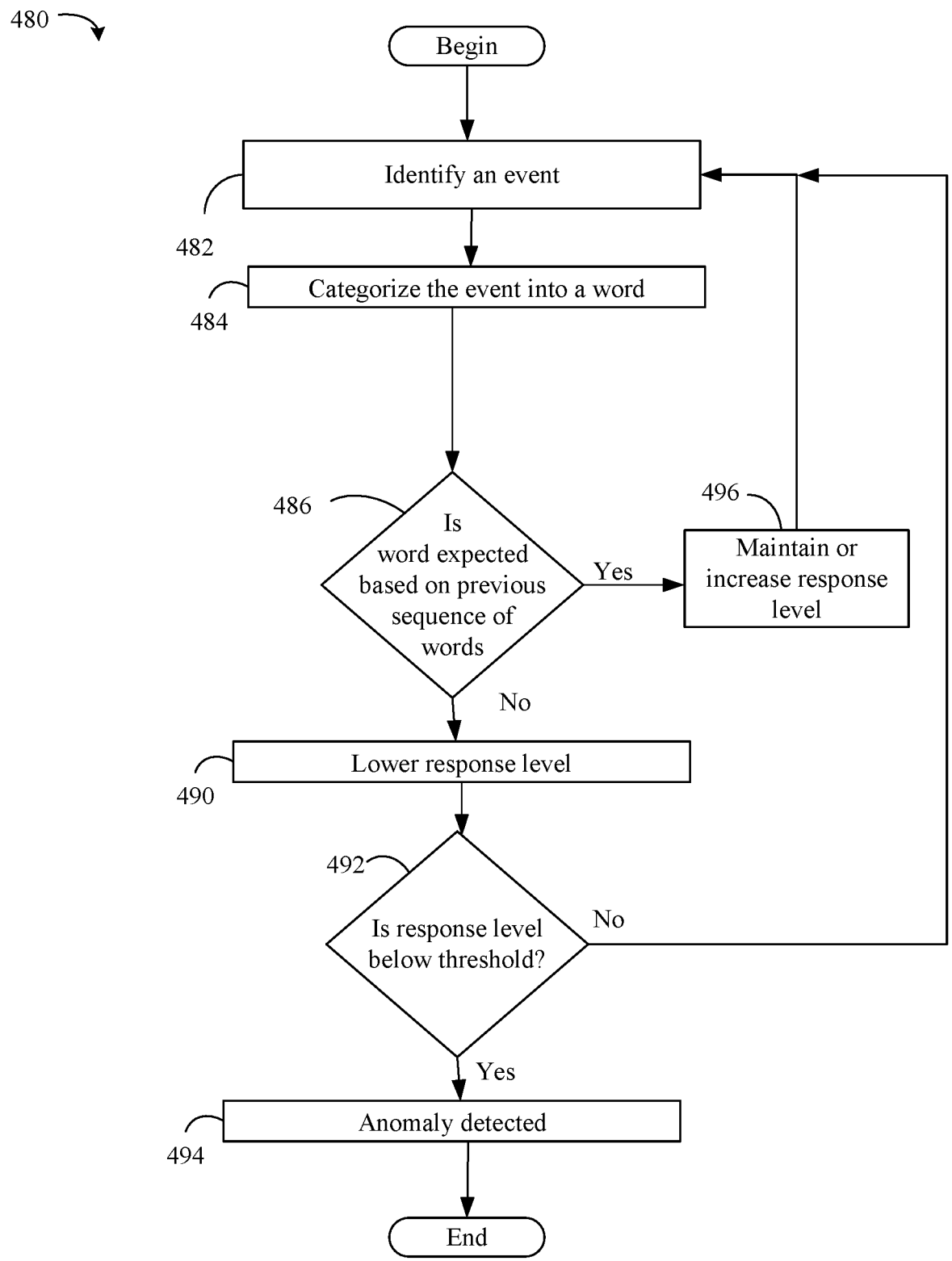
FIG. 10 is a flowchart of an example of a method of detecting whether an anomaly is occurring based on natural language processing according to an embodiment.

FIG. 10 shows a method 480 of detecting whether an anomaly is occurring based on NLP. The method 480 may be readily implemented with the event processing system 124 (FIG. 1), method 300 (FIG. 2), natural language processing system 360 (FIG. 3), remediation system 368 (FIG. 4) and/or natural language processor 366 (FIG. 4). already discussed. More particularly, the method 480 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 482 identifies an event. Illustrated processing block 484 categorizes the event into a word. Illustrated processing block 486 determines whether the word is expected based on a previous sequence of words. For example, a neural network may identify whether the neural network predicts that the word will occurs based on the previous words (e.g., whether the previous words logically lead to the word based on a probability analysis and a domain specific language definition module). In some embodiments, a probability of the word occurring based on the previous words may be identified. For example, if the probability of the word occurring is above a threshold or if the neural network predicts that the word will occur, then the word may be deemed to be expected.

If so, illustrated processing block 496 may maintain or increase a response level of the neural network. Otherwise, illustrated processing block 490 may lower a response level. Illustrated processing block 492, determines if the response level is below a threshold. If not, illustrated processing block 482 may execute. Otherwise, illustrated processing block 494 detect an anomaly. In some embodiments, the method 480 may further include remediating the anomaly in some fashion (e.g., institute corrective measures to mitigate the anomaly).

Figure 11:
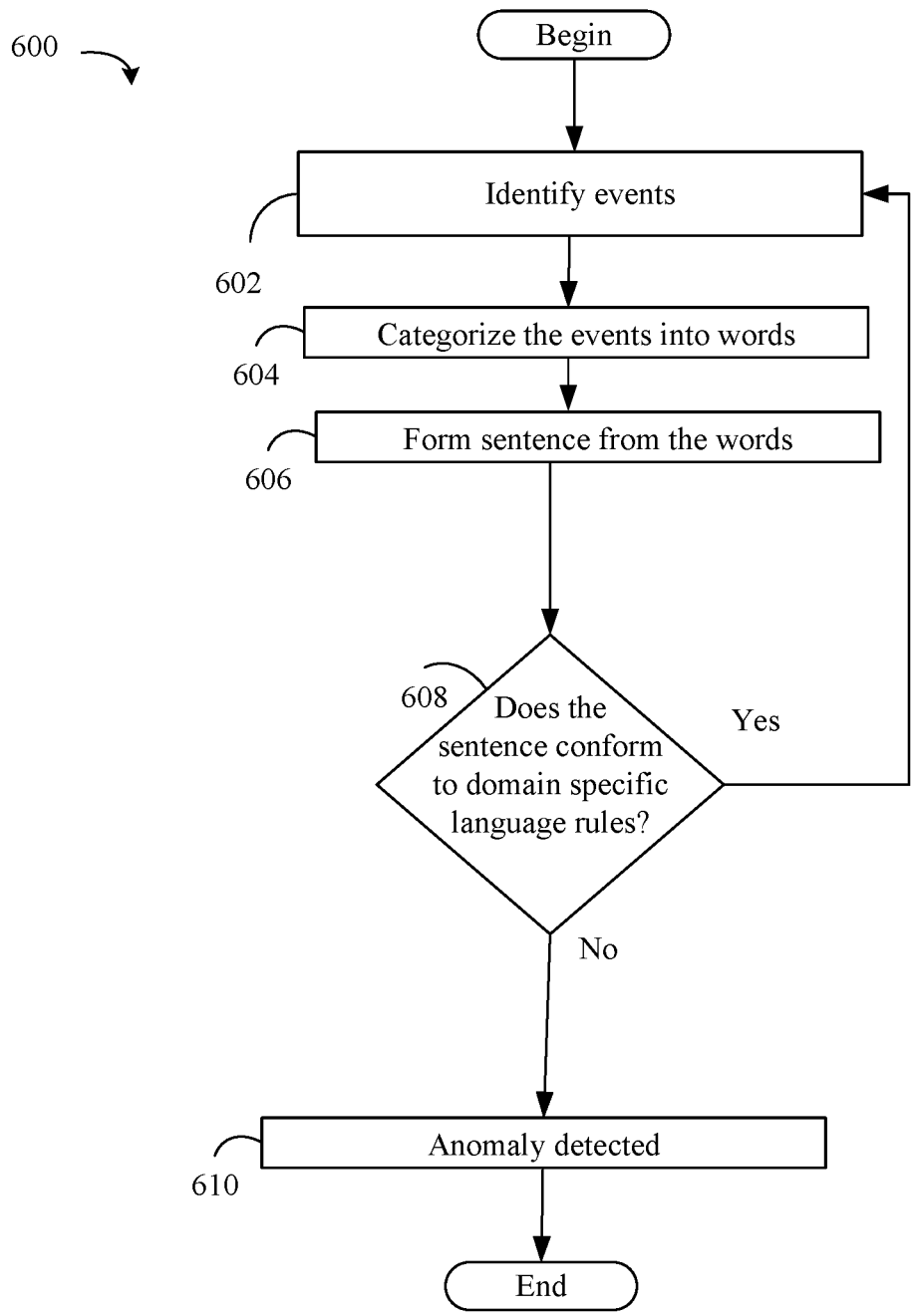
FIG. 11 is a flowchart of an example of a method of detecting whether an anomaly is occurring based on domain specific language rules according to an embodiment.

FIG. 11 shows a method 600 of detecting whether an anomaly is occurring based on domain specific language rules. The method 600 may be readily implemented with the event processing system 124 (FIG. 1), method 300 (FIG. 2), natural language processing system 360 (FIG. 3), remediation system 368 (FIG. 4) and/or natural language processor 366 (FIG. 4), already discussed. More particularly, the method 600 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 602 identifies events. Illustrated processing block 604 categorizes the events into words. Illustrated processing block 606 forms a sentence from the words. Illustrated processing block 608 determines if the sentence conforms to domain specific language rules. If so, the method 600 may continue and no anomaly is detected. If the sentence does not conform to domain specific language, illustrated processing block 610 detects and anomaly. In some embodiments, the method 600 may further include remediating the anomaly in some fashion (e.g., institute corrective measures to mitigate the anomaly).

Figure 12:
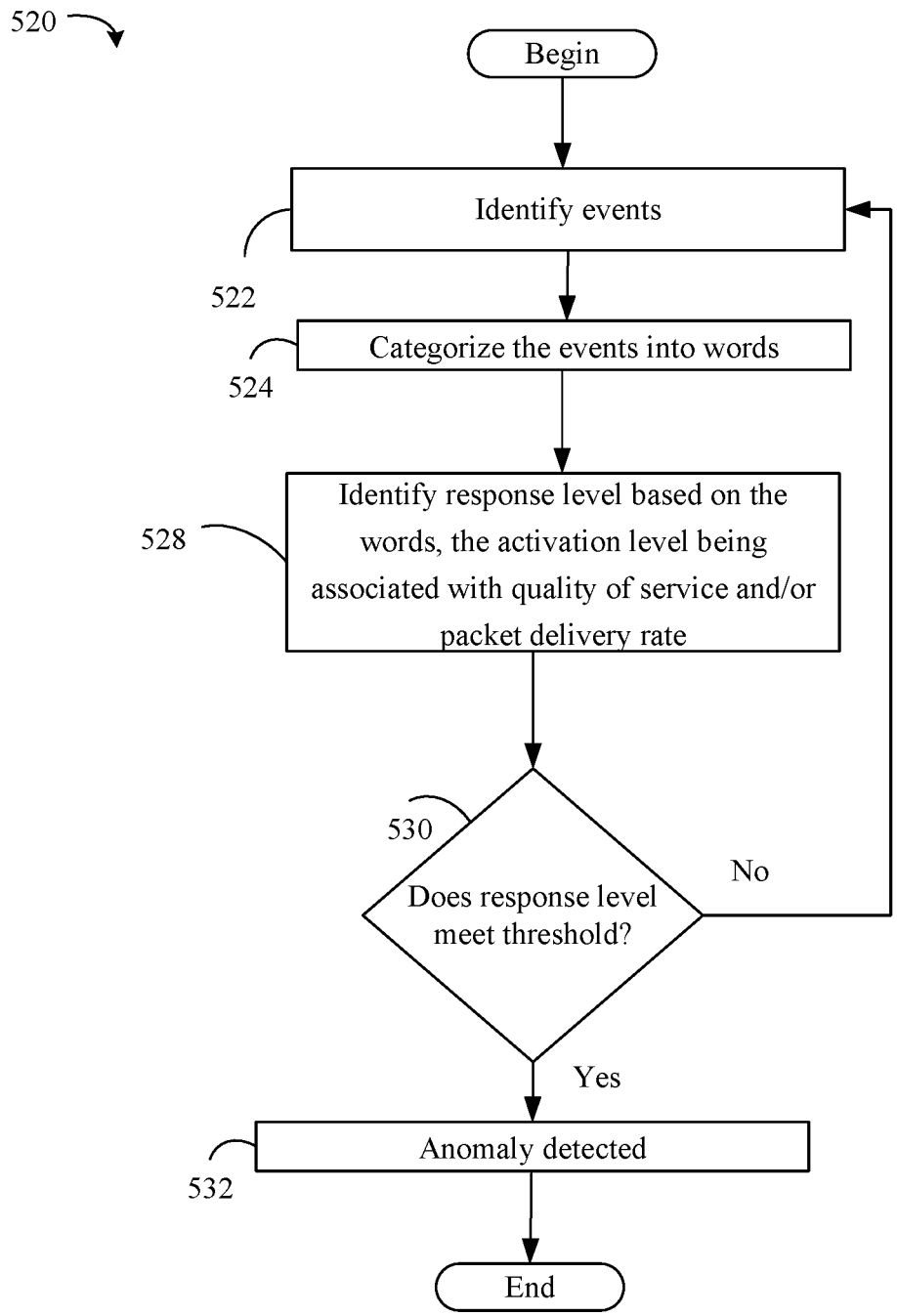
FIG. 12 is a flowchart of an example of a method of detecting whether a quality-of-service and/or packet data rate are anomalous according to an embodiment.

FIG. 12 shows a method 520 of detecting whether a QoS and/or PDR are anomalous (e.g., unacceptably low). The method 520 may be readily implemented with the event processing system 124 (FIG. 1), method 300 (FIG. 2), natural language processing system 360 (FIG. 3), remediation system 368 (FIG. 4) and/or natural language processor 366 (FIG. 4), already discussed. More particularly, the method 480 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 522 identifies events. Illustrated processing block 524 categorizes the events into words. Illustrated processing block 528 identifies a response level of a neural network based on the words, the activation level being associated with quality of service and/or PDR. Illustrated processing block 530 determines if the response level meets the threshold. If so, illustrated processing block 522 identifies events. Otherwise, illustrated processing block 532 detects the anomaly. In some embodiments, the method 520 may further include remediating the anomaly in some fashion (e.g., institute corrective measures to mitigate the anomaly).

Figure 13:
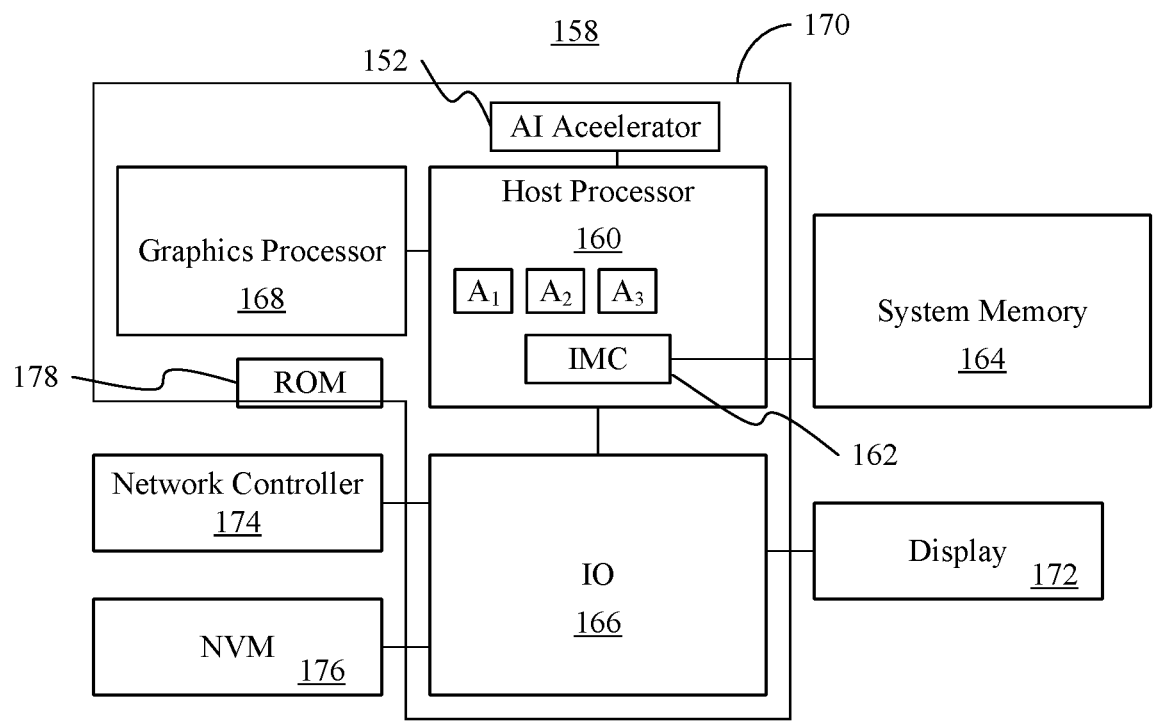
FIG. 13 is a block diagram of an example of a computing system according to an embodiment.

Turning now to FIG. 13, a performance-enhanced computing system 158 (e.g., a computing device) is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 158 includes a host processor 160 (e.g., CPU with one or more processor cores) having an integrated memory controller (IMC) 162 that is coupled to a system memory 164. The host processor 160 further includes accelerators $A_1$-$A_3$ (although any number of accelerators may be provided) to implement a neural network. In some embodiments, the system 158 may further communicate through the network controller 174 with other electronic devices that also implement the neural network and/or control the other electronic devices based on an output (e.g., response level) of the neural network.

The illustrated system 158 also includes a graphics processor 168 (e.g., graphics processing unit/GPU) and an input output (IO) module 166 implemented together with the processor 160 (e.g., as microcontrollers) on a semiconductor die 170 as a system on chip (SOC), where the IO module 166 may communicate with, for example, a display 172 (e.g., touch screen, liquid crystal display/LCD, light emitting diode/LED display), a network controller 174 (e.g., wired and/or wireless), and mass storage 176 (e.g., HDD, optical disc, SSD, flash memory or other NVM). The illustrated SOC 170 includes a ROM 178 with logic instructions, which when executed by the host processor 160 or graphics processor 160, cause the computing system 158 to implement and/or perform one or more aspects of the process 100 (FIG. 1), method 300 (FIG. 2), process 350 (FIG. 3), process 362 (FIG. 4), neural network 430 (FIG. 7), neural network 510 (FIG. 9A), method 480 (FIG. 10), method 600 (FIG. 11) and method 520 (FIG. 12), already discussed.

In some embodiments, the system 158 may further include processors (not shown) and/or AI accelerator 152 dedicated to artificial intelligence (AI) and/or neural network (NN) processing. For example, the system SoC 170 may include vision processing units (VPUs) and/or other AI/NN-specific processors, etc. In some embodiments, any aspect of the embodiments described herein may be implemented in the processors and/or accelerators dedicated to AI and/or NN processing such as AI accelerator 152, the graphics processor 168 and/or the host processor 160.

Thus, the illustrated system 158 may train a neural network to develop language syntax models and vocabularies for events. That is, the neural network may implement NLP to analyze events and identify whether the events are anomalous. The neural network may provide response levels that correspond to anomalous events and remediate anomalous events as the events arise. In some embodiments, the system 158 may transmit a message to the electronic devices through the network controller 174 to instruct the electronic devices to remediate events identified as anomalous. In some embodiments, anomalous events and associated data is displayed to a user on the display 172.

Figure 14:
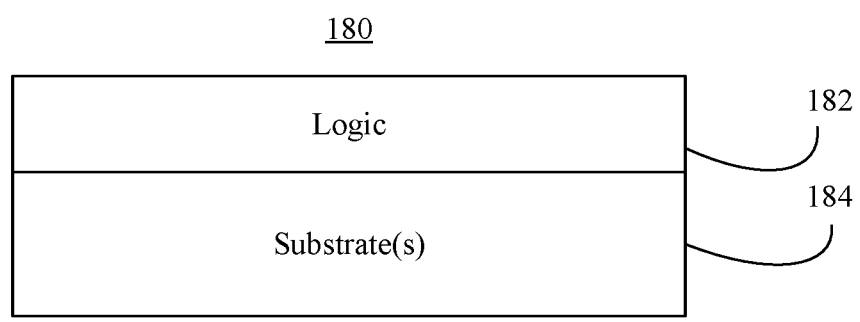
FIG. 14 is an illustration of an example of a semiconductor apparatus according to an embodiment.

FIG. 14 shows a semiconductor package apparatus 180. The illustrated apparatus 180 includes one or more substrates 184 (e.g., silicon, sapphire, gallium arsenide) and logic 182 (e.g., transistor array and other integrated circuit/IC components) coupled to the substrate(s) 184. In one example, the logic 182 is implemented at least partly in configurable logic or fixed-functionality logic hardware. The logic 182 may implement and/or perform one or more aspects of the process 100 (FIG. 1), method 300 (FIG. 2), process 350 (FIG. 3), process 362 (FIG. 4), neural network 430 (FIG. 7), neural network 510 (FIG. 9A), method 480 (FIG. 10), method 600 (FIG. 11) and method 520 (FIG. 12), already discussed. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

In some embodiments, the logic 182 may further include processors (not shown) and/or accelerators (not shown) dedicated to AI and/or NN processing. For example, the logic 182 may include VPUs, and/or other AI/NN-specific processors, etc. In some embodiments, any aspect of the embodiments described herein may be implemented in the processors and/or accelerators dedicated to AI and/or NN processing.

Figure 15:
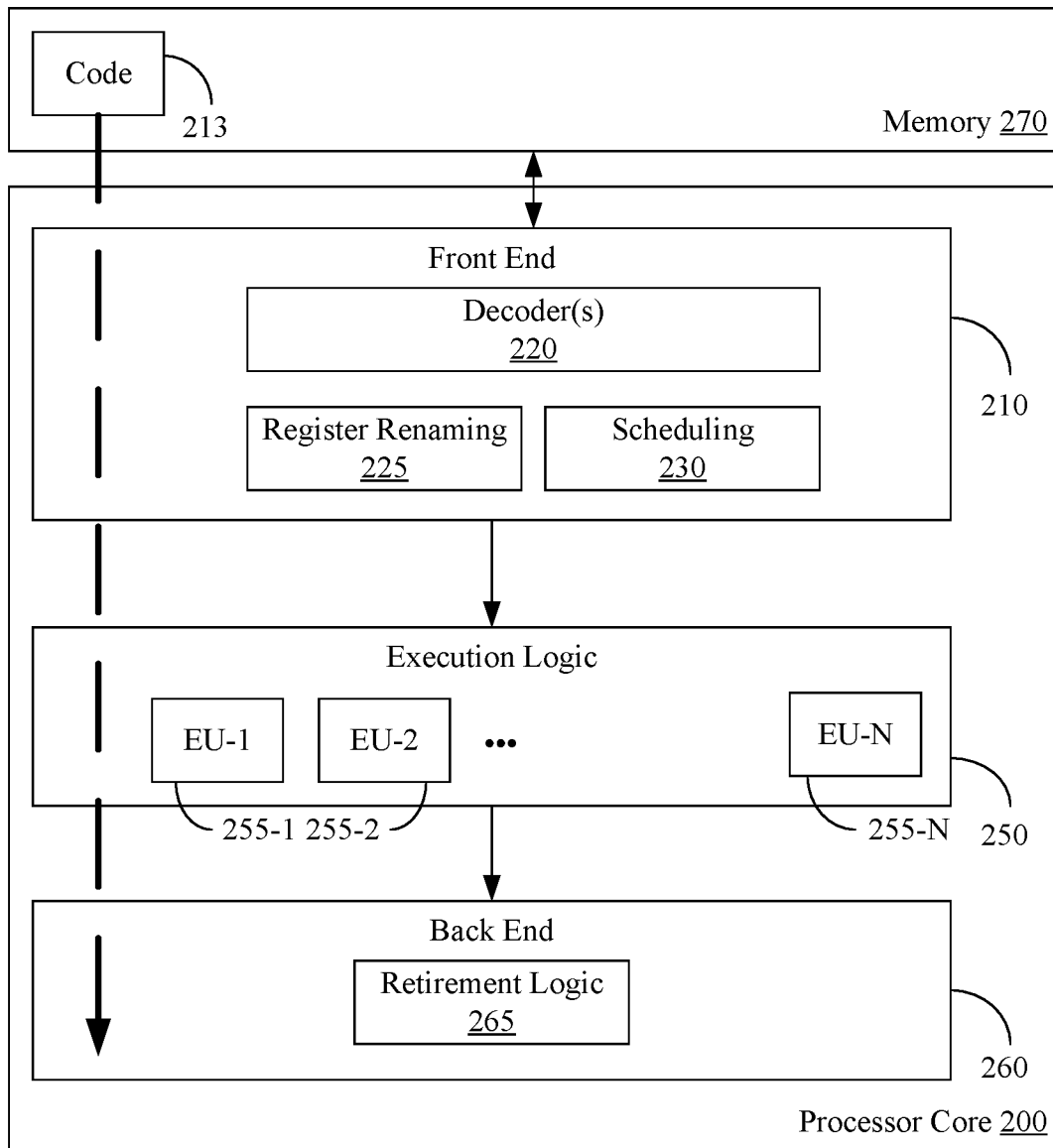
FIG. 15 is a block diagram of an example of a processor according to an embodiment.

FIG. 15 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 15, a processing element may alternatively include more than one of the processor core 200 illustrated in FIG. 15. The processor core 200 may be a single-threaded core or, for at least one embodiment, the processor core 200 may be multithreaded in that it may include more than one hardware thread context (or "logical processor") per core.

FIG. 15 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement and/or perform one or more aspects of one or more aspects of the process 100 (FIG. 1), method 300 (FIG. 2), process 350 (FIG. 3), process 362 (FIG. 4), neural network 430 (FIG. 7), neural network 510 (FIG. 9A), method 480 (FIG. 10), method 600 (FIG. 11) and method 520 (FIG. 12), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 15, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 16:
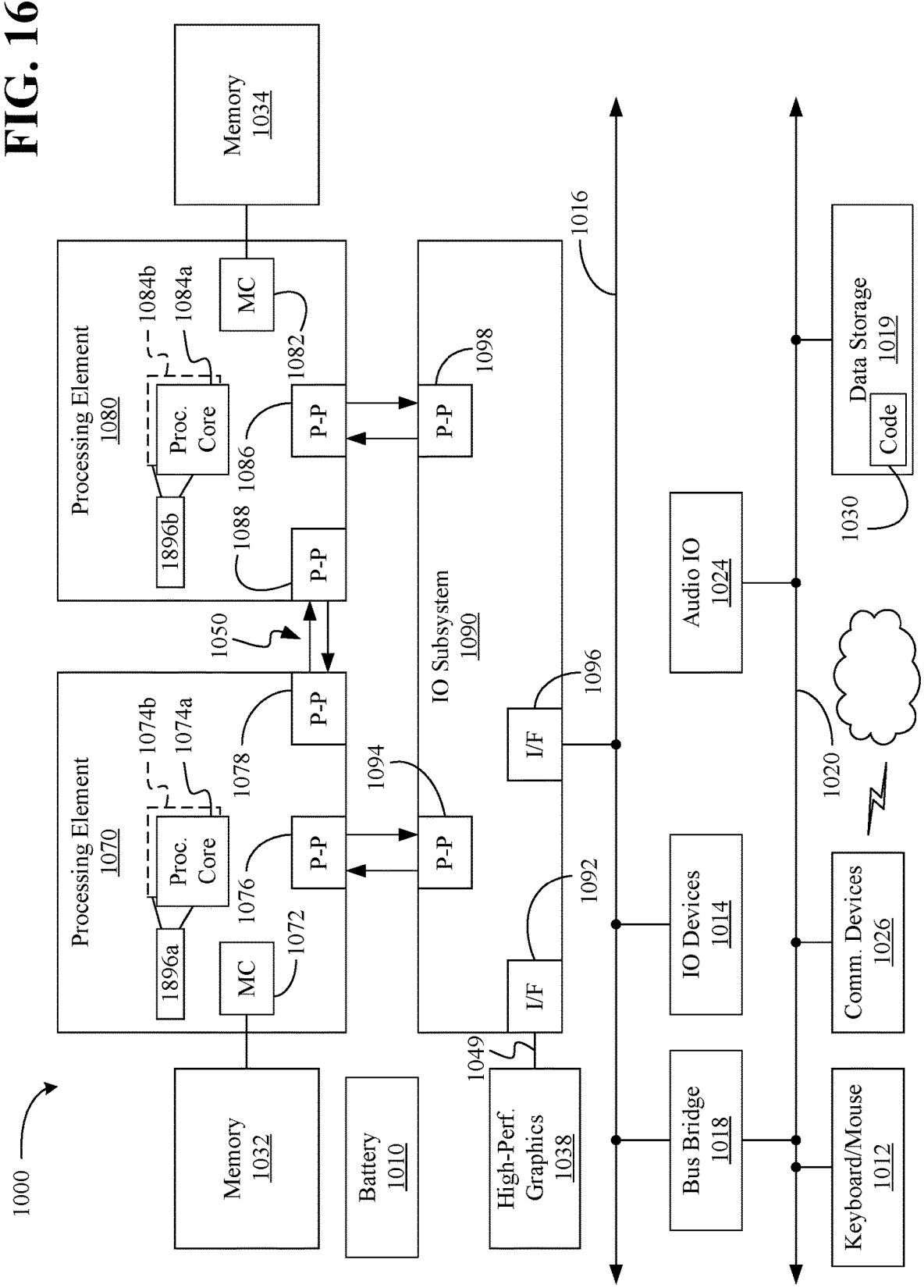
FIG. 16 is a block diagram of an example of a multi-processor based computing system according to an embodiment.

Referring now to FIG. 16, shown is a block diagram of a computing system 1000 embodiment in accordance with an embodiment. Shown in FIG. 16 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 16 may be implemented as a multi-drop bus rather than point-to-point interconnect.

As shown in FIG. 16, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 15.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 16, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 16, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 16, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement and/or perform one or more aspects of the process 100 (FIG. 1), method 300 (FIG. 2), process 350 (FIG. 3), process 362 (FIG. 4), neural network 430 (FIG. 7), neural network 510 (FIG. 9A), method 480 (FIG. 10), method 600 (FIG. 11) and method 520 (FIG. 12), already discussed. Further, an audio I/O 1024 may be coupled to second bus 1020 and a battery 1010 may supply power to the computing system 1000.

Note that other embodiments are contemplated. For example, instead of the point-to-point architecture of FIG. 16, a system may implement a multi-drop bus or another such communication topology. Also, the elements of FIG. 16 may alternatively be partitioned using more or fewer integrated chips than shown in FIG. 16.

ADDITIONAL NOTES AND EXAMPLES

Example 1 includes a computing device comprising a storage device to store a log of events associated with a computer architecture, a graphics processor, a host processor, and a memory including a set of instructions, which when executed by one or more of the graphics processor or the host processor, cause the computing device to identify a sequence of events from the log, categorize, with a natural language processing system, the sequence of events into a sequence of words, identify an anomaly based on the sequence of words, and trigger an automatic remediation process in response to an identification of the anomaly.

Example 2 includes the computing device of Example 1, wherein the instructions, when executed, cause the computing device identify words from the sequence of events based on a vocabulary associated with the computer architecture, arrange the identified words into the sequence of words, generate at least one sentence based on the sequence of words, conduct a determination that the at least one sentence is to be dissimilar from any sentence structure defined by a domain specific language associated with the computer architecture, and identify the anomaly based on the determination.

Example 3 includes the computing device of Example 1, wherein the instructions, when executed, cause the computing device to identify that a next word is unable to be predicted based on the sequence of words, and identify the anomaly in response to the next word being unpredictable.

Example 4 includes the computing device of Example 1, wherein the instructions, when executed, cause the computing device to generate a level of response based on the sequence of words, wherein the level of response is to be associated with a quality-of-service measurement, and identify the anomaly based on the level of response meeting a threshold.

Example 5 includes the computing device of Example 1, wherein the anomaly is to be a deviation from an expected behavior, and the automatic remediation process is to include an adjustment to one or more of a hardware parameter to one or more of mitigate or prevent the anomaly or an adjustment to a software parameter to one or more of mitigate or prevent the anomaly.

Example 6 includes the computing device of any one of Examples 1 to 5, wherein the natural language processing system is to be one or more neural networks.

Example 7 includes a semiconductor apparatus comprising one or more substrates, and logic coupled to the one or more substrates, wherein the logic is implemented in one or more of configurable logic or fixed-functionality logic hardware, the logic coupled to the one or more substrates to identify a sequence of events associated with a computer architecture, categorize, with a natural language processing system, the sequence of events into a sequence of words, identify an anomaly based on the sequence of words, and trigger an automatic remediation process in response to an identification of the anomaly.

Example 8 includes the apparatus of Example 7, wherein the logic coupled to the one or more substrates is to identify words from the sequence of events based on a vocabulary associated with the computer architecture, arrange the identified words into the sequence of words, generate at least one sentence based on the sequence of words, conduct a determination that the at least one sentence is to be dissimilar from any sentence structure defined by a domain specific language associated with the computer architecture, and identify the anomaly based on the determination.

Example 9 includes the apparatus of Example 7, wherein the logic coupled to the one or more substrates is to identify that a next word is unable to be predicted based on the sequence of words, and identify the anomaly in response to the next word being unpredictable.

Example 10 includes the apparatus of Example 7, wherein the logic coupled to the one or more substrates is to generate a level of response based on the sequence of words, wherein the level of response is to be associated with a quality-ofservice measurement, and identify the anomaly based on the level of response meeting a threshold.

Example 11 includes the apparatus of Example 7, wherein the anomaly is to be a deviation from an expected behavior, and the automatic remediation process is to include an adjustment to one or more of a hardware parameter to one or more of mitigate or prevent the anomaly or an adjustment to a software parameter to one or more of mitigate or prevent the anomaly.

Example 12 includes the apparatus of any one of Examples 7 to 11, wherein the natural language processing system is to be one or more neural networks.

Example 13 includes the apparatus of any one of Examples 7 to 11, wherein the logic coupled to the one or more substrates includes transistor channel regions that are positioned within the one or more substrates.

Example 14 includes at least one computer readable storage medium comprising a set of instructions, which when executed by a computing device, cause the computing device to identify a sequence of events associated with a computer architecture, categorize, with a natural language processing system, the sequence of events into a sequence of words, identify an anomaly based on the sequence of words, and trigger an automatic remediation process in response to an identification of the anomaly.

Example 15 includes the at least one computer readable storage medium of Example 14, wherein the instructions, when executed, cause the computing device to identify words from the sequence of events based on a vocabulary associated with the computer architecture, arrange the identified words into the sequence of words, generate at least one sentence based on the sequence of words, conduct a determination that the at least one sentence is to be dissimilar from any sentence structure defined by a domain specific language associated with the computer architecture, and identify the anomaly based on the determination.

Example 16 includes the at least one computer readable storage medium of Example 14, wherein the instructions, when executed, cause the computing device to identify that a next word is unable to be predicted based on the sequence of words, and identify the anomaly in response to the next word being unpredictable.

Example 17 includes the at least one computer readable storage medium of Example 14, wherein the instructions, when executed, cause the computing device to generate a level of response based on the sequence of words, wherein the level of response is to be associated with a quality-of-service measurement, and identify the anomaly based on the level of response meeting a threshold.

Example 18 includes the at least one computer readable storage medium of Example 14, wherein the anomaly is to be a deviation from an expected behavior, and the automatic remediation process is to include an adjustment to one or more of a hardware parameter to one or more of mitigate or prevent the anomaly or an adjustment to a software parameter to one or more of mitigate or prevent the anomaly.

Example 19 includes the at least one computer readable storage medium of any one of Examples 14 to 18, wherein the natural language processing system is to be one or more neural networks.

Example 20 includes a method comprising identifying a sequence of events associated with a computer architecture, categorizing, with a natural language processing system, the sequence of events into a sequence of words, identifying an anomaly based on the sequence of words, and triggering an automatic remediation process in response to an identification of the anomaly.

Example 21 includes the method of Example 20, further including identifying words from the sequence of events based on a vocabulary associated with the computer architecture, arranging the identified words into the sequence of words, generating at least one sentence based on the sequence of words, and conducting a determination that the at least one sentence is to be dissimilar from any sentence structure defined by a domain specific language associated with the computer architecture, and identifying the anomaly based on the determination.

Example 22 includes the method of Example 20, further comprising identifying that a next word is unable to be predicted based on the sequence of words, and identifying the anomaly in response to the next word being unpredictable.

Example 23 includes the method of Example 20, further comprising generating a level of response based on the sequence of words, wherein the level of response is to be associated with a quality-of-service measurement, and identifying the anomaly based on the level of response meeting a threshold.

Example 24 includes the method of Example 20, wherein the anomaly is to be a deviation from an expected behavior, and the automatic remediation process includes an adjustment to one or more of a hardware parameter to one or more of mitigate or prevent the anomaly or an adjustment to a software parameter to one or more of mitigate or prevent the anomaly.

Example 25 includes the method of any one of Examples 20 to 24, wherein the natural language processing system is to be one or more neural networks.

Example 26 includes a semiconductor apparatus comprising means for identifying a sequence of events associated with a computer architecture, means for categorizing, with a natural language processing system, the sequence of events into a sequence of words, means for identifying an anomaly based on the sequence of words, and means for triggering an automatic remediation process in response to an identification of the anomaly.

Example 27 includes the apparatus of Example 26, further comprising means for identifying words from the sequence of events based on a vocabulary associated with the computer architecture, means for arranging the identified words into the sequence of words, means for generating at least one sentence based on the sequence of words, means for conducting a determination that the at least one sentence is to be dissimilar from any sentence structure defined by a domain specific language associated with the computer architecture, and means for identifying the anomaly based on the determination.

Example 28 includes the apparatus of Example 26, further comprising means for identifying that a next word is unable to be predicted based on the sequence of words, and means for identifying the anomaly in response to the next word being unpredictable.

Example 29 includes the apparatus of Example 26, further comprising means for generating a level of response based on the sequence of words, wherein the level of response is to be associated with a quality-of-service measurement, and means for identifying the anomaly based on the level of response meeting a threshold.

Example 30 includes the apparatus of Example 26, wherein the anomaly is to be a deviation from an expected behavior, and the automatic remediation process includes an adjustment to one or more of a hardware parameter to one or more of mitigate or prevent the anomaly or an adjustment to a software parameter to one or more of mitigate or prevent the anomaly.

Example 31 includes the apparatus of any one of Examples 26 to 30, wherein the natural language processing system is to be one or more neural networks.

Thus, technology described herein may generate a unique language for events. The unique language may provide insights into event flows that may otherwise be difficult if not impossible to practically detect. Thus, the technology may provide robust analysis that facilitates identification and mitigation of potential anomalies. Furthermore, the technology may implement a new and enhanced neural network analysis to identify anomalies and respond accordingly.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing device comprising:
   a storage device to store a log of events associated with a computer architecture;
   a graphics processor;
   a host processor; and
   a memory including a set of instructions, which when executed by one or more of the graphics processor or the host processor, cause the computing device to:
      identify a domain specific language that includes a language vocabulary, wherein the domain specific language is to define a syntax for words of the language vocabulary, and wherein the words correspond to events;
      identify a sequence of events from the log;
      categorize, with a natural language processing system, the sequence of events into a sequence of words;
      generate at least one sentence based on the sequence of words, wherein the at least one sentence includes one sentence that is formed from words of the sequence of words that are based on different events from the sequence of events;
      identify an anomaly based on the at least one sentence failing to follow the syntax; and
      trigger an automatic remediation process in response to an identification of the anomaly.

2. The computing device of claim 1, wherein the instructions, when executed, cause the computing device to:
   identify words from the sequence of events based on the language vocabulary;
   arrange the identified words into the sequence of words;
   conduct a determination that the at least one sentence is to be dissimilar from any sentence structure defined by the domain specific language;
   identify the anomaly based on the determinations;
   form training words based on training log events from a software code base, wherein each log event from the training log events is to correspond to a word from the training words; and
   generate the language vocabulary and the syntax based on the words that are formed based on the training log events.

3. The computing device of claim 1, wherein the instructions, when executed, cause the computing device to:
   identify that a next word is unable to be predicted based on the sequence of words; and
   identify the anomaly in response to the next word being unpredictable.

4. The computing device of claim 1, wherein the instructions, when executed, cause the computing device to:
   generate a level of response based on the sequence of words, wherein the level of response is to be associated with a quality-of-service measurement; and
   identify the anomaly based on the level of response meeting a threshold.

5. The computing device of claim 1, wherein the anomaly is to be a deviation from an expected behavior, and the automatic remediation process is to include an adjustment to one or more of a hardware parameter to one or more of mitigate or prevent the anomaly or an adjustment to a software parameter to one or more of mitigate or prevent the anomaly.

6. The computing device of claim 1, wherein the natural language processing system is to be one or more neural networks.

7. A semiconductor apparatus comprising:
one or more substrates; and
logic coupled to the one or more substrates, wherein the logic is implemented in one or more of configurable logic or fixed-functionality logic hardware, the logic coupled to the one or more substrates to:
identify a domain specific language that includes a language vocabulary, wherein the domain specific language is to define a syntax for words of the language vocabulary, and wherein the words correspond to events;
identify a sequence of events associated with a computer architecture;
categorize, with a natural language processing system, the sequence of events into a sequence of words;
generate at least one sentence based on the sequence of words, wherein the at least one sentence includes one sentence that is formed from words of the sequence of words that are based on different events from the sequence of events;
identify an anomaly based on the at least one sentence failing to follow the syntax; and
trigger an automatic remediation process in response to an identification of the anomaly.

8. The apparatus of claim 7, wherein the logic coupled to the one or more substrates is to:
identify words from the sequence of events based on the language vocabulary;
arrange the identified words into the sequence of words;
conduct a determination that the at least one sentence is to be dissimilar from any sentence structure defined by the domain specific languages;
identify the anomaly based on the determinations;
form training words based on training log events from a software code base, wherein each log event from the training log events is to correspond to a word from the training words; and
generate the language vocabulary and the syntax based on the words that are formed based on the training log events.

9. The apparatus of claim 7, wherein the logic coupled to the one or more substrates is to:
identify that a next word is unable to be predicted based on the sequence of words; and
identify the anomaly in response to the next word being unpredictable.

10. The apparatus of claim 7, wherein the logic coupled to the one or more substrates is to:
generate a level of response based on the sequence of words, wherein the level of response is to be associated with a quality-of-service measurement; and
identify the anomaly based on the level of response meeting a threshold.

11. The apparatus of claim 7, wherein the anomaly is to be a deviation from an expected behavior, and the automatic remediation process is to include an adjustment to one or more of a hardware parameter to one or more of mitigate or prevent the anomaly or an adjustment to a software parameter to one or more of mitigate or prevent the anomaly.

12. The apparatus of claim 7, wherein the natural language processing system is to be one or more neural networks.

13. The apparatus of claim 7, wherein the logic coupled to the one or more substrates includes transistor channel regions that are positioned within the one or more substrates.

14. At least one non-transitory computer readable storage medium comprising a set of instructions, which when executed by a computing device, cause the computing device to:
identify a domain specific language that includes a language vocabulary, wherein the domain specific language is to define a syntax for words of the language vocabulary, and wherein the words correspond to events;
identify a sequence of events associated with a computer architecture;
categorize, with a natural language processing system, the sequence of events into a sequence of words;
generate at least one sentence based on the sequence of words, wherein the at least one sentence includes one sentence that is formed from words of the sequence of words that are based on different events from the sequence of events;
identify an anomaly based on the at least one sentence failing to follow the syntax; and
trigger an automatic remediation process in response to an identification of the anomaly.

15. The at least one non-transitory computer readable storage medium of claim 14, wherein the instructions, when executed, cause the computing device to:
identify words from the sequence of events based on the language vocabulary;
arrange the identified words into the sequence of words;
conduct a determination that the at least one sentence is to be dissimilar from any sentence structure defined by the domain specific language;
identify the anomaly based on the determination;
form training words based on training log events from a software code base, wherein each log event from the training log events is to correspond to a word from the training words; and
generate the language vocabulary and the syntax based on the words that are formed based on the training log events.

16. The at least one non-transitory computer readable storage medium of claim 14, wherein the instructions, when executed, cause the computing device to:
identify that a next word is unable to be predicted based on the sequence of words; and
identify the anomaly in response to the next word being unpredictable.

17. The at least one non-transitory computer readable storage medium of claim 14, wherein the instructions, when executed, cause the computing device to:
generate a level of response based on the sequence of words, wherein the level of response is to be associated with a quality-of-service measurement; and
identify the anomaly based on the level of response meeting a threshold.

18. The at least one non-transitory computer readable storage medium of claim 14, wherein the anomaly is to be a deviation from an expected behavior, and the automatic remediation process is to include an adjustment to one or more of a hardware parameter to one or more of mitigate or prevent the anomaly or an adjustment to a software parameter to one or more of mitigate or prevent the anomaly.

19. The at least one non-transitory computer readable storage medium of claim 14, wherein the natural language processing system is to be one or more neural networks.

20. A method comprising:
identifying a domain specific language that includes a language vocabulary, wherein the domain specific language defines a syntax for words of the language vocabulary, and wherein the words correspond to events;
identifying a sequence of events associated with a computer architecture;
categorizing, with a natural language processing system, the sequence of events into a sequence of words;
generating at least one sentence based on the sequence of words, wherein the at least one sentence includes one sentence that is formed from words of the sequence of words that are based on different events from the sequence of events;
identifying an anomaly based on the at least one sentence failing to follow the syntax; and
triggering an automatic remediation process in response to an identification of the anomaly.

21. The method of claim 20, further comprising:
identifying words from the sequence of events based on the language vocabulary;
arranging the identified words into the sequence of words;
conducting a determination that the at least one sentence is dissimilar from any sentence structure defined by the domain specific language;
identifying the anomaly based on the determination;
forming training words based on training log events from a software code base, wherein each log event from the training log events corresponds to a word from the training words; and
generating the language vocabulary and the syntax based on the words that are formed based on the training log events.

22. The method of claim 20, further comprising:
identifying that a next word is unable to be predicted based on the sequence of words; and
identifying the anomaly in response to the next word being unpredictable.

23. The method of claim 20, further comprising:
generating a level of response based on the sequence of words, wherein the level of response is associated with a quality-of-service measurement; and
identifying the anomaly based on the level of response meeting a threshold.

24. The method of claim 20, wherein the anomaly is to be a deviation from an expected behavior, and the automatic remediation process includes an adjustment to one or more of a hardware parameter to one or more of mitigate or prevent the anomaly or an adjustment to a software parameter to one or more of mitigate or prevent the anomaly.

25. The method of claim 20, wherein the natural language processing system is to be one or more neural networks.

* * * * *